(12) United States Patent  
Cassidy

(10) Patent No.: US 6,547,180 B1
(45) Date of Patent: Apr. 15, 2003

(54) IMPELLER-POWERED VERTICAL TAKEOFF AND DESCENT AIRCRAFT

(76) Inventor: David Bernard Cassidy, 6 Chidden Close, Greasby, Wirral, Merseyside, CH43 3AA (GB)

( * ) Notice: Subject to any disclaimer, the term of this patent is extended or adjusted under 35 U.S.C. 154(b) by 0 days.

(21) Appl. No.: 09/811,583

(22) Filed: Mar. 20, 2001

(30) Foreign Application Priority Data

Mar. 22, 2000 (GB) ............................................... 0006810

(51) Int. Cl.[7] ............................................... B64C 29/04
(52) U.S. Cl. ................................... 244/12.5; 244/23 C
(58) Field of Search .......................... 244/6, 12.1, 12.3, 244/12.4, 12.5, 12.6, 17.11, 17.19, 236, 23 D, 23 C

(56) References Cited

U.S. PATENT DOCUMENTS

| 3,901,463 A | * | 8/1975 | Kovacs ...................... 244/12.6 |
| 4,901,948 A | | 2/1990 | Panos |
| 5,026,002 A | * | 6/1991 | Yarrington ................. 244/12.1 |
| 5,454,531 A | * | 10/1995 | Melkuti ..................... 244/12.6 |
| 5,516,060 A | | 5/1996 | McDonnell |
| 6,170,778 B1 | * | 1/2001 | Cycon et al. ............... 244/12.3 |

FOREIGN PATENT DOCUMENTS

| EP | 0418998 A1 | * | 3/1991 | ........... B64C/29/00 |
| WO | 91/17083 | | 11/1991 | |
| WO | 92/01603 | | 2/1992 | |

* cited by examiner

*Primary Examiner*—Charles T. Jordan
*Assistant Examiner*—Timothy D. Collins
(74) *Attorney, Agent, or Firm*—Dennison, Schultz & Dougherty

(57) ABSTRACT

A vertical take-off and vertical descent aircraft having a vertically extending main air duct extending through the body and having an air inlet at the top and a number of air outlets at the bottom, two oppositely rotatable impellers located in said duct and operable to create a downward thrust of air, wing ducts extending from an air distributor to spaced apart extremities of the wings and exiting in downward directions for stabilization, a rear air duct at the rear of the body with an air outlet for forward propulsion and directional control, and means for controlling air direction at the outlet of each of the wing ducts and at the bottom outlet duct and at the rear outlet.

32 Claims, 23 Drawing Sheets

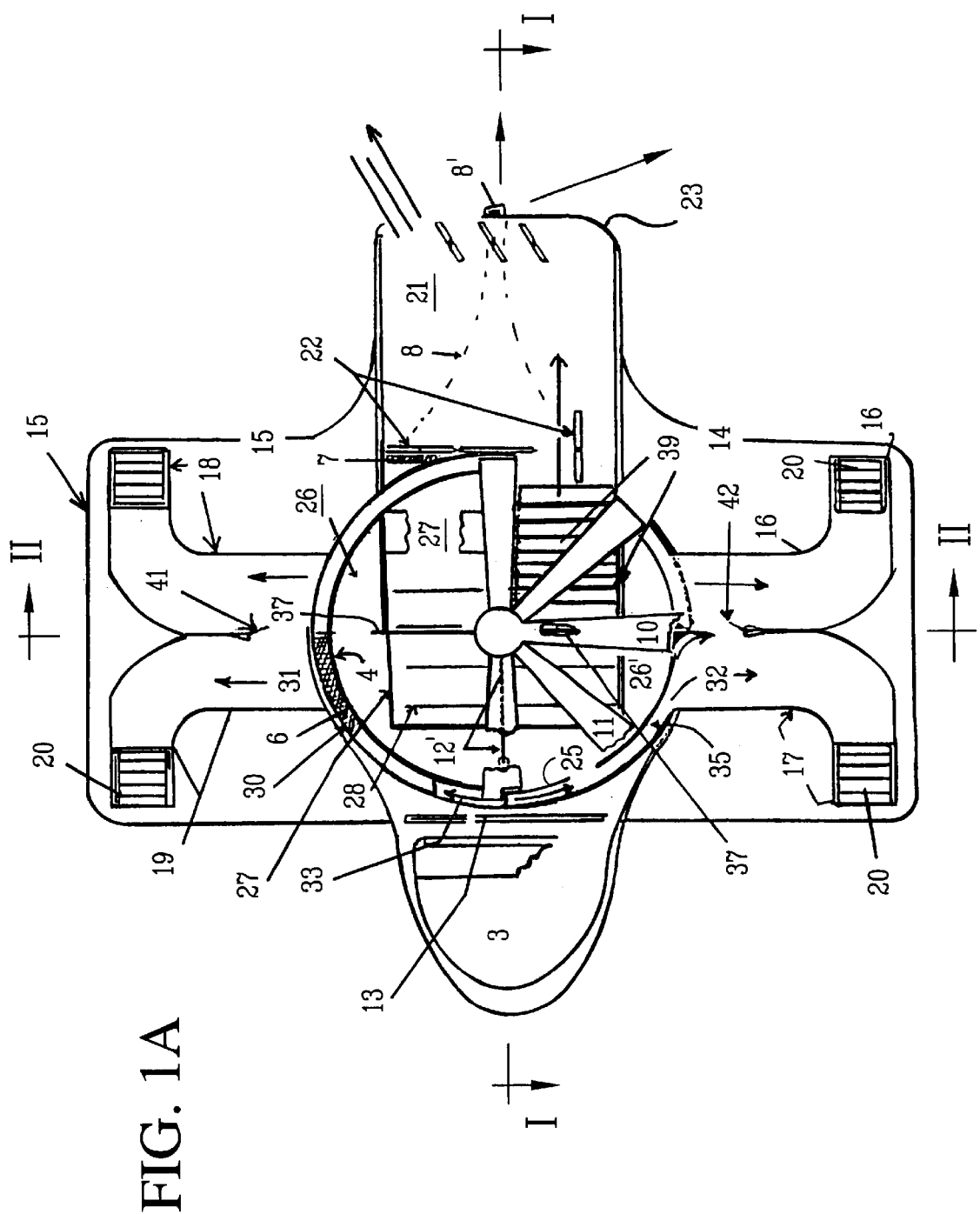

IMPELLER-POWERED VERTICAL TAKEOFF AND DESCENT AIRCRAFT

FIELD OF THE INVENTION

The present invention relates to a vertical take-off aircraft.

BACKGROUND OF THE INVENTION

Vertical take-off aircraft are known especially for military purposes wherein a jet engine is located within the main fuselage between the wings and has a plurality of complexly controlled swivelable nozzles which direct the hot air thrust downwardly during vertical take-off and landing and swivel for forward and reverse flight.

It is also known to provide an aircraft wherein the ends of the wings carry propellers which are displaceable from a take-off position wherein the propellers rotate about a substantially vertical axis to a horizontal position for normal flight although considerable difficulties have been experienced in controlling the aircraft when effecting the transition from one position to the other.

A professor Paul Moller has been developing flying cars since 1963 and currently proposes using eight small jet engines and where the thrust is deflectable from horizontal to vertical directions and vice versa but such does not have wings.

Other proposals using multiple jet engines, even some without aerofoils/wings, have been proposed and such are expensive, complex, noisy and produce a hot air blast which can be damaging to the surroundings.

SUMMARY OF THE INVENTION

It is an object of the present invention to provide a vertical take-off personal aircraft which is economical and simple to produce with acceptable noise output and without the use of hot air jets for landing.

According to the present invention there is provided a vertical take-off and vertical landing aircraft comprising an aircraft body or fuselage having at least one wing or aerofoil means extending either side of the fuselage or integral therewith to provide lift for the aircraft with forward movement, a normally vertically or substantially vertically extending main air duct extending through the fuselage having at least one air inlet at the top and at least one air outlet at the bottom, an impeller or fan means located in said duct and operable to create a downward flow of air and comprising two oppositely or contra-rotatable impellers or fans driven to rotate about a vertical or substantially vertical axis within said duct and wherein air is directed to air distribution or air-directing means located beneath the rotary impeller or fan means, said distribution means causing some of the air-flow to flow through wing ducts extending to extremities of the wings and exiting in a downward direction and located in spaced apart regions in each wing or on the side of the fuselage to optimize stability, and a rear air duct leading to the rear of the fuselage with an air outlet for optionally contributing to forward propulsion and directional control, and at least one engine connected to drive said rotary impeller or fan means and preferably located beneath the normal level or substantially beneath the normal horizontal plane or level in which the wing outlets lie so as to contribute to the stability of the aircraft, and control means for controlling air deflection at the outlet of each of the wing ducts and of the bottom outlet duct and the rear outlet when provided. Preferably a single, high powered engine will be provided although for longer range for city-to-city travel, for example, an additional rear thrust drive may be achieved by means of an additional engine such as a dedicated jet engine.

Preferably the aircraft pilot (and any passenger) will sit in a balanced position forwardly of the impeller duct and as low down as possible relative to the centre of gravity of the aircraft and the air outlets in the wing.

Preferably the outlets in the wing and the outlet at the bottom will have air deflection means such as a plurality of parallel normally horizontally disposed deflector blades or foils pivotable about substantially horizontal axes and displaceable together somewhat in the manner similar to that of a louvre window so as to enable the flow of air therepast to be directionally adjusted and controlled so that transition from vertical direction to forward direction is possible by deflecting the air stream rearwardly and vice-versa. Similarly, horizontally disposed pivotal deflectors may be controllably locatable in the rear outlet duct for upward and downward directional control.

Preferably the vertical air ducting means, for efficiency, will have a lower part beneath the impeller means and a lower converging central portion leading to a, preferably, elongate rectangular slot and in which air deflectors are located with the main axis of the slot i.e. the longer sides, running fore and aft relative to the extension of the fuselage in the normal direction of forward travel.

Preferably the lower part of the main air duct forms the air distribution means and includes a rear air duct running from the normally rear side of said converging central portions when provided to the rear air outlet and preferably the lower part is divided by a baffle wall centrally transverse to the fuselage and has an optionally displaceable flap or deflection or closure means associated therewith and operable so as to deflect some air as desired instead of going downwardly for vertical lift, but rather so as to flow rearwardly to the rearwardly directed air duct to supplement the forward propulsion and/or left and right movement control and possibly also the upward and downward movement control. Around a flow-dividing wall of lower part which preferably comprises an the outer upper cylindrical wall portion of said central duct, there is an outer, preferably concentrically located, cylindrical duct-defining wall having diametrically opposite outlet passages for the flow of air to the wing ducts on either side and forming part of the air-flow distribution means.

Also to ensure a smooth and efficient and equal division of air to the ducts in both wings, the space between the inner and outer concentric cylindrical walls forming the wing duct air-flow take-off part of the distribution means is divided either side of a diametrical line preferably extending in fore and aft direction and preferably by deflection chutes- running gradually downwardly, closing-off the space between the cylindrical walls somewhat in the appearance of a helter-skelter chute with the chute walls running downwardly and inclined outwardly and leading to openings in the outer cylindrical walls connected to the wing air-flow ducts and wing outlets.

The impellers or fan blades are preferably arranged to be contra-rotating so as to cancel out any torque effect and to avoid the need for a tail rotor as used on helicopters which stops the fuselage rotating although other means for fuselage directional control may be provided if contra-rotation is not desired.

For regions of the body of the fuselage provided for aesthetic and aerodynamic purposes which create cavities therebeneath, such may be sealed or filled with expanded foam material or the like so that such acts as flotation means so that the aircraft can float on water - i.e. a filed double skin arrangement can be provided.

The body of the aircraft is preferably made of carbon fiber.

The engine will importantly have to be a high powered engine and lightweight.

Suitable control means, which may be a computer control, are provided for balancing and controlling the airflow deflector members and engine etc.

It will be appreciated that the present invention provides an aircraft which is quiet to operate and simple to produce and utilises cold air propulsion without hot air jets in the take-off and landing mode. In the event of engine failure with the aircraft having a vertical axis rotor or turbine or impeller, landing conventionally only using the extra lift from the wing is possible. The centralised thrust provides a stable arrangement which is more readily controllable especially in the transition from vertical movement to horizontal movement. The wings of aerofoil section, of course, provide a lift effect in forward motion.

It is considered that hitherto the most difficult problem to overcome was the transition from vertical lift-off to horizontal flight and vice-versa.

Further in respect of prior aircraft, the necessary power to weight ratio has only normally been possible with military jet engines since a dead lift is a difficult requirement.

In every case hitherto the flight transition problem has been responsible for delays in development beyond what might have been expected and in fact delaying development for years.

To solve this problem it has now been realised that one should avoid the hitherto mistake of rotating 100% of the lifting force (engine) and expecting the aircraft to remain stable.

The present invention enables the main thrust to be kept vertical with only a slight shift of thrust until forward momentum has been attained, further stability being maintained from the wingtips.

The control means are to be such that at no time can the pilot move the controls to override the thrust sequence to maintain stability until it is in the flying mode excepting to prolong vertical take-off i.e. by manually holding-on but automatic controls limit the time in these modes and will then cycle to fly.

One cause of the great lack of stability of VTOL aircraft in past models has been because the wings are in the same plane as the engines.

The present invention provides for stability by a configuration with a low centre of gravity because of the engine location is as it were a ships' keel and it is also intended in some embodiments, the aircraft might float and take-off from water.

The present invention provides a new and inventive combination which hitherto had not been considered in the design of aircraft or, if it might have been, would likely have been discarded since the idea of using an air duct extending from the top to the bottom of an aircraft with the inlet to the duct being upwardly open at the top would not have considered operable because of the anticipated loss of intake of air as would result during forward movement of the aircraft since it would be expected that the loss of induced air would incur because air would pass directly over the air inlet. If one envisages that perhaps 500,000 cubic feet of air would be required to lift an aircraft, half would be expected to be lost upon forward movement. However, the inventive concept of the present invention utilises the realisation that with forward movement of the aircraft, lift occurs as a result of the air flowing over the aerofoil sections which means that the volume of downwardly directed air can be reduced by reducing the hitherto required high revolutions per minute required of the engine for lift which revolutions are no longer required for forward movement and thus any loss of inlet air because of air passing over the top of the inlet duct as a result of forward motion becomes unimportant since such is compensated for by the aerofoil lift effect and the possibility to reduce the revving of the engine with a reduction in intake requirements for upward lift by the down thrust. The provision of the rear propulsion enhances its forward movement and flight.

In hovering flight, high power is used but no forward flight is achieved. The thrust/weight ratio required for control, lift and manoeuvring whilst hovering is around 1.4 while the lift/drag in cruising flight may be around 10 say and the equivalent cruising thrust/weight is 0.1.

It will be seen that the energy required for normal flight is minimal compared to VTO resulting in the contra rotating impellers being almost at idle during flight, but are still able to supply all the air that is required for the rear impellers to draw from with aid of the deflector.

BRIEF DESCRIPTION OF THE INVENTION

The present invention will be described further, by way of example, with reference to the accompanying drawings, in which.

Figure 1B:
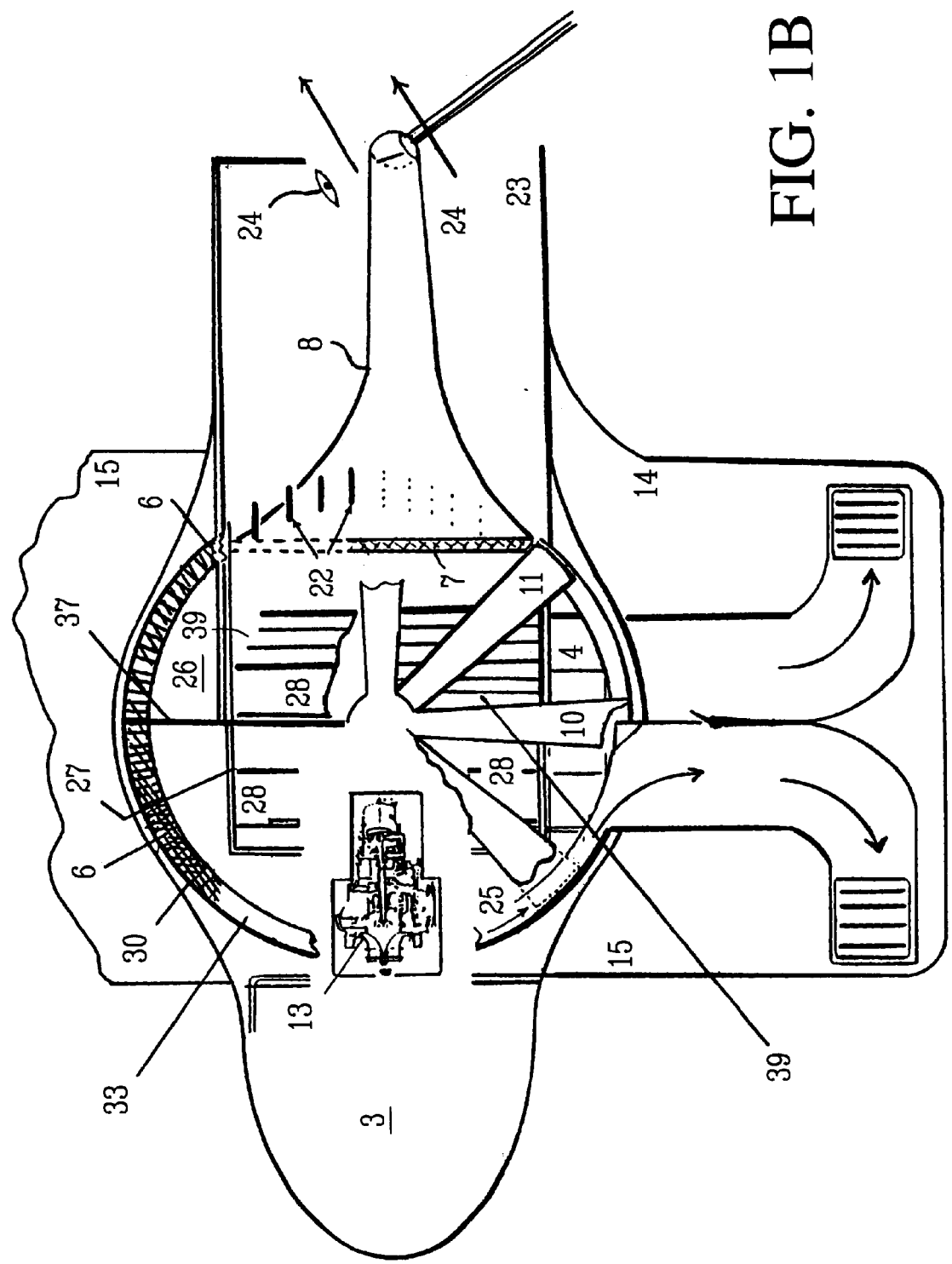
FIG. 1B is an enlarged fragmentary detail of a central portion of the aircraft of FIG. 1A.
Figure 1C:
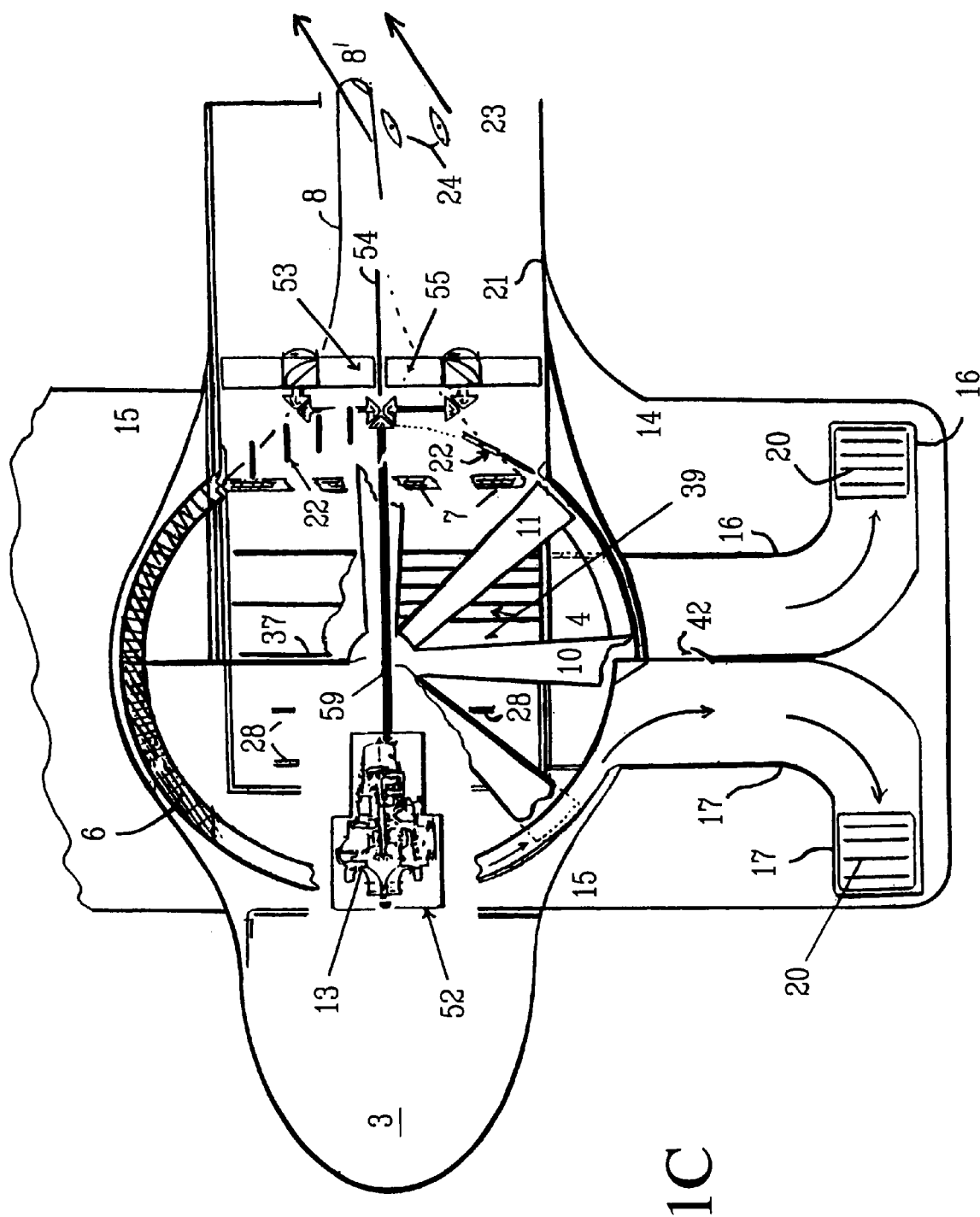
FIG. 1A is a schematic part cut-away plan of an aircraft according to the invention illustrating the top air inlet and indicating the wing ducts and outlets and the rear duct and outlet, the passenger compartment and the engine location.
Figure 2:
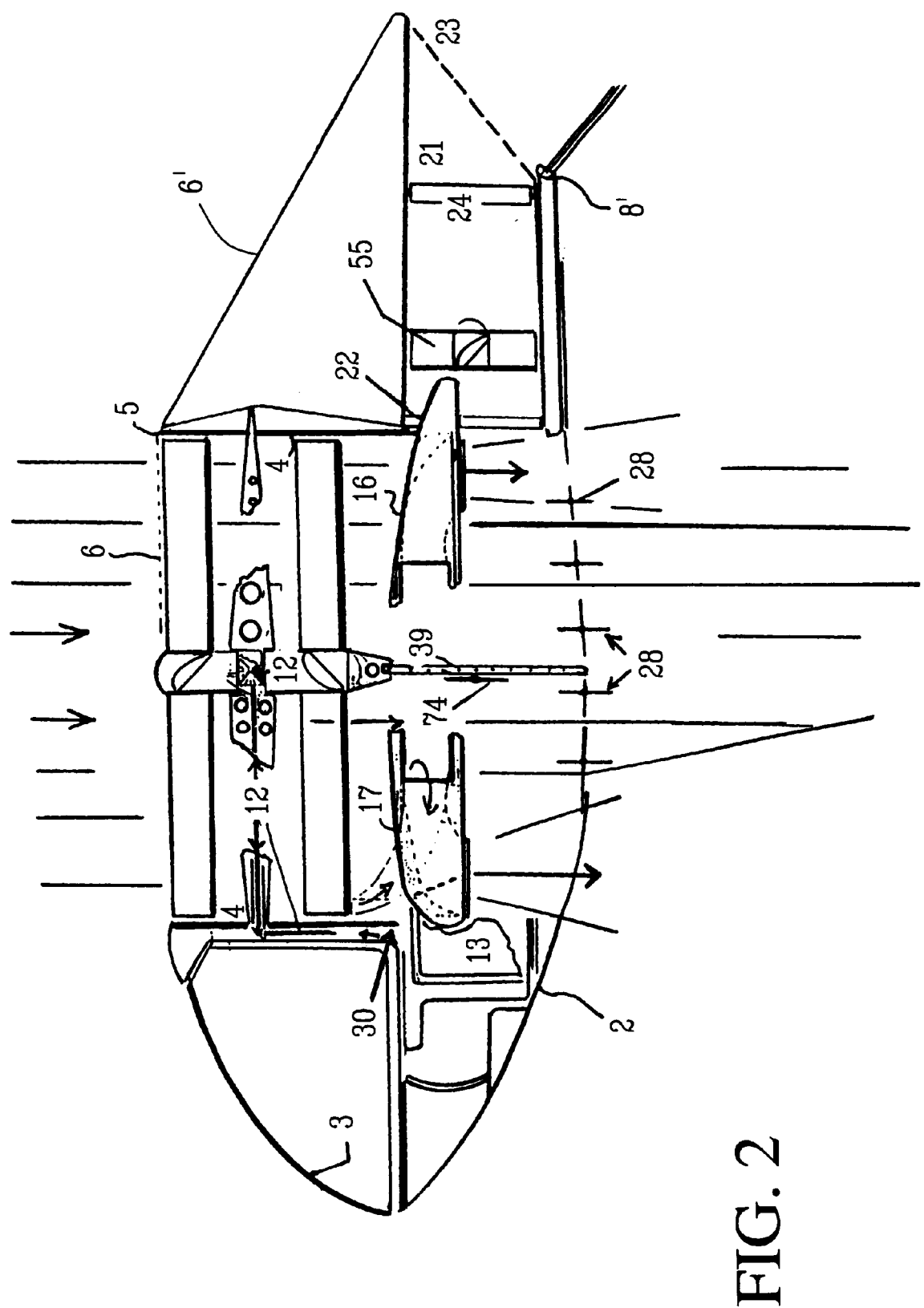
Figure 2A:
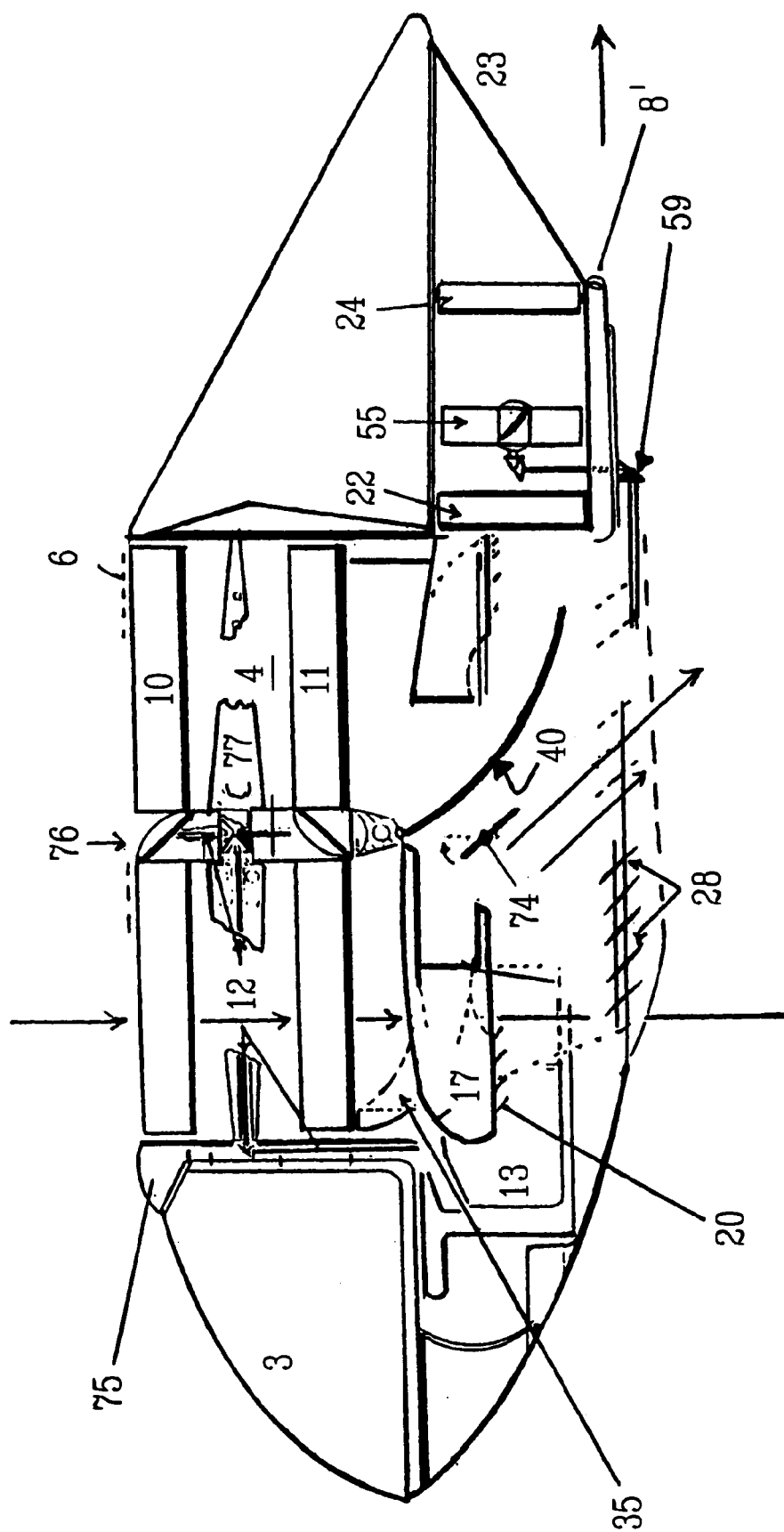
Figure 2B:
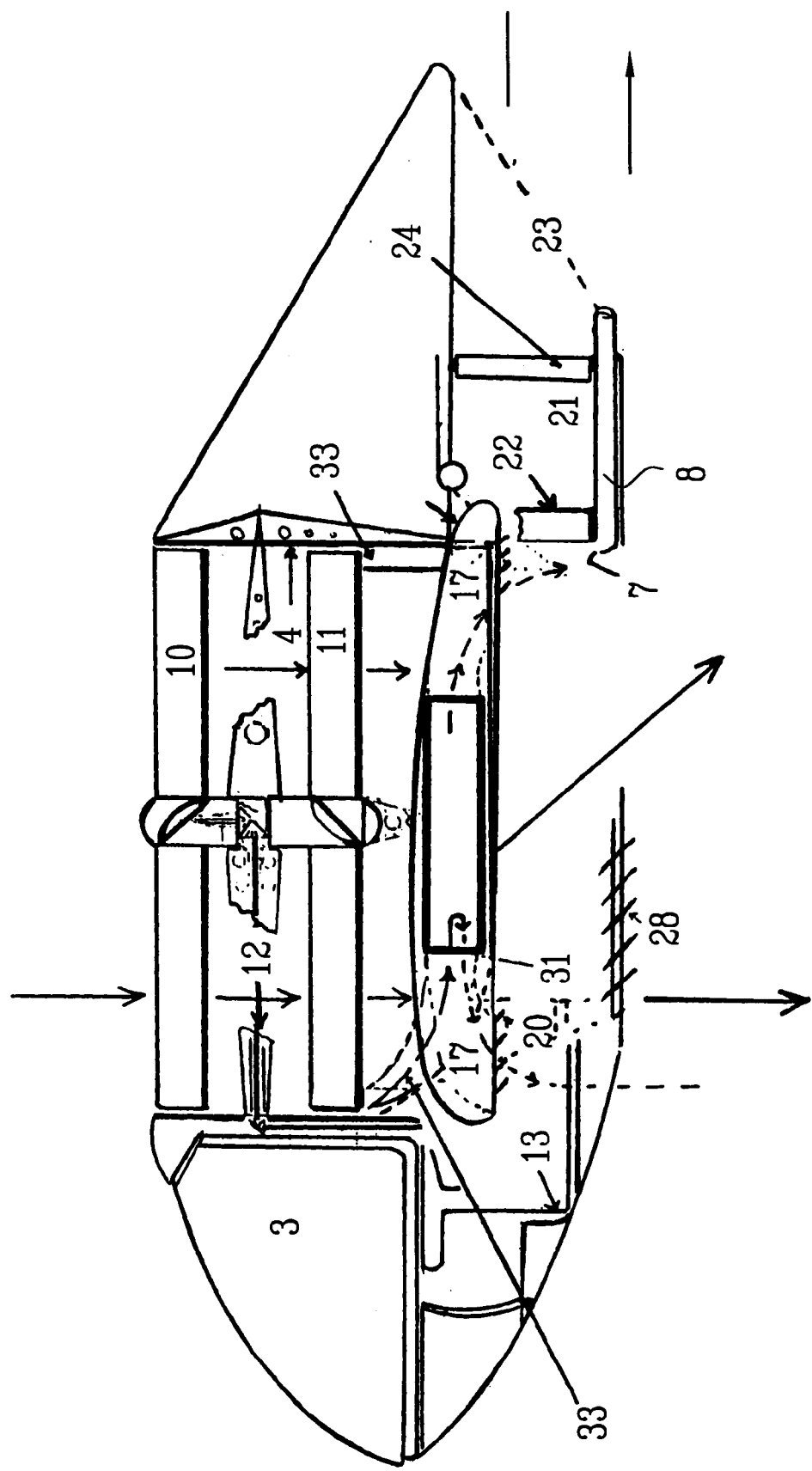
Figure 2C:
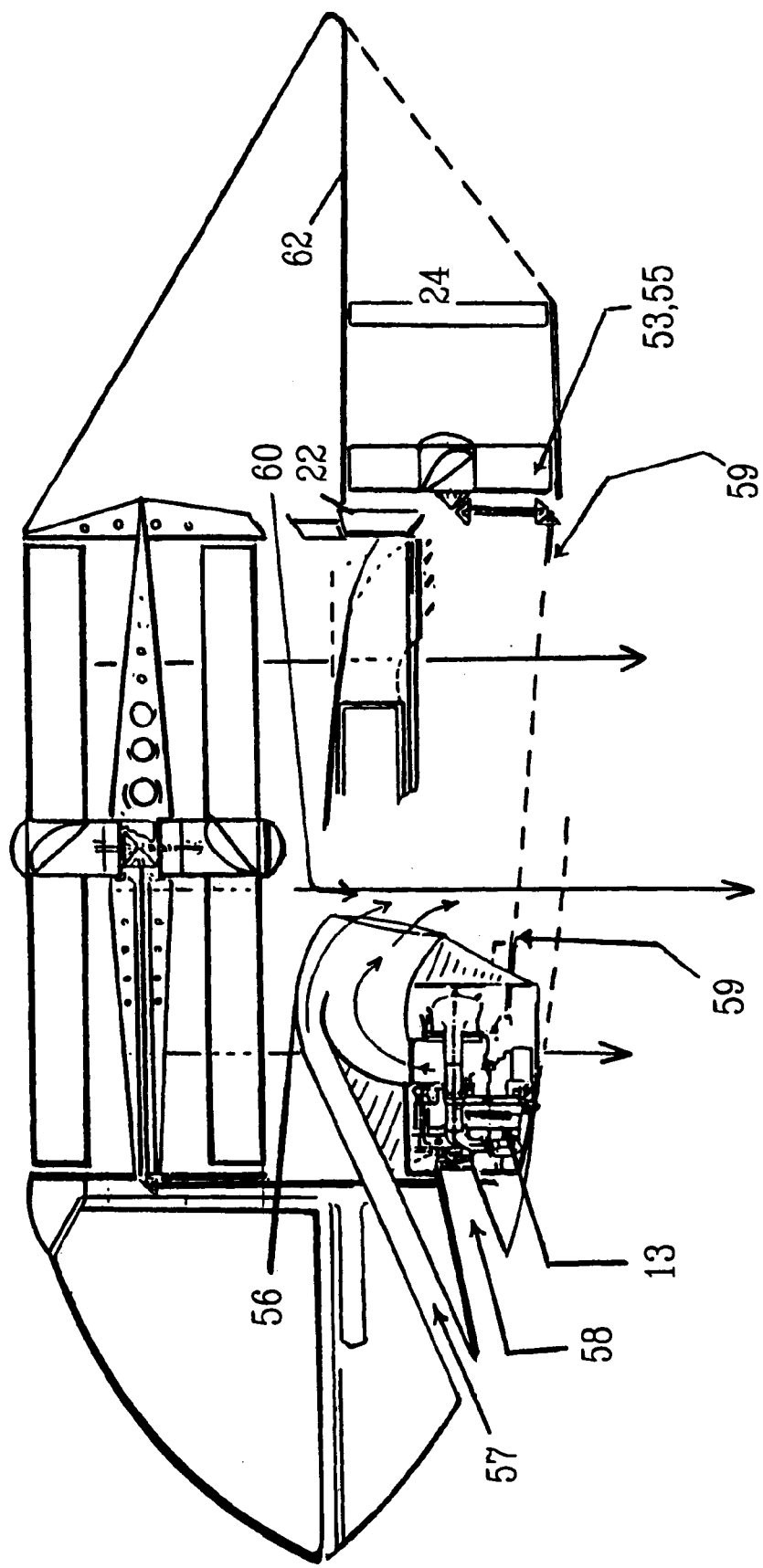
Figure 2D:
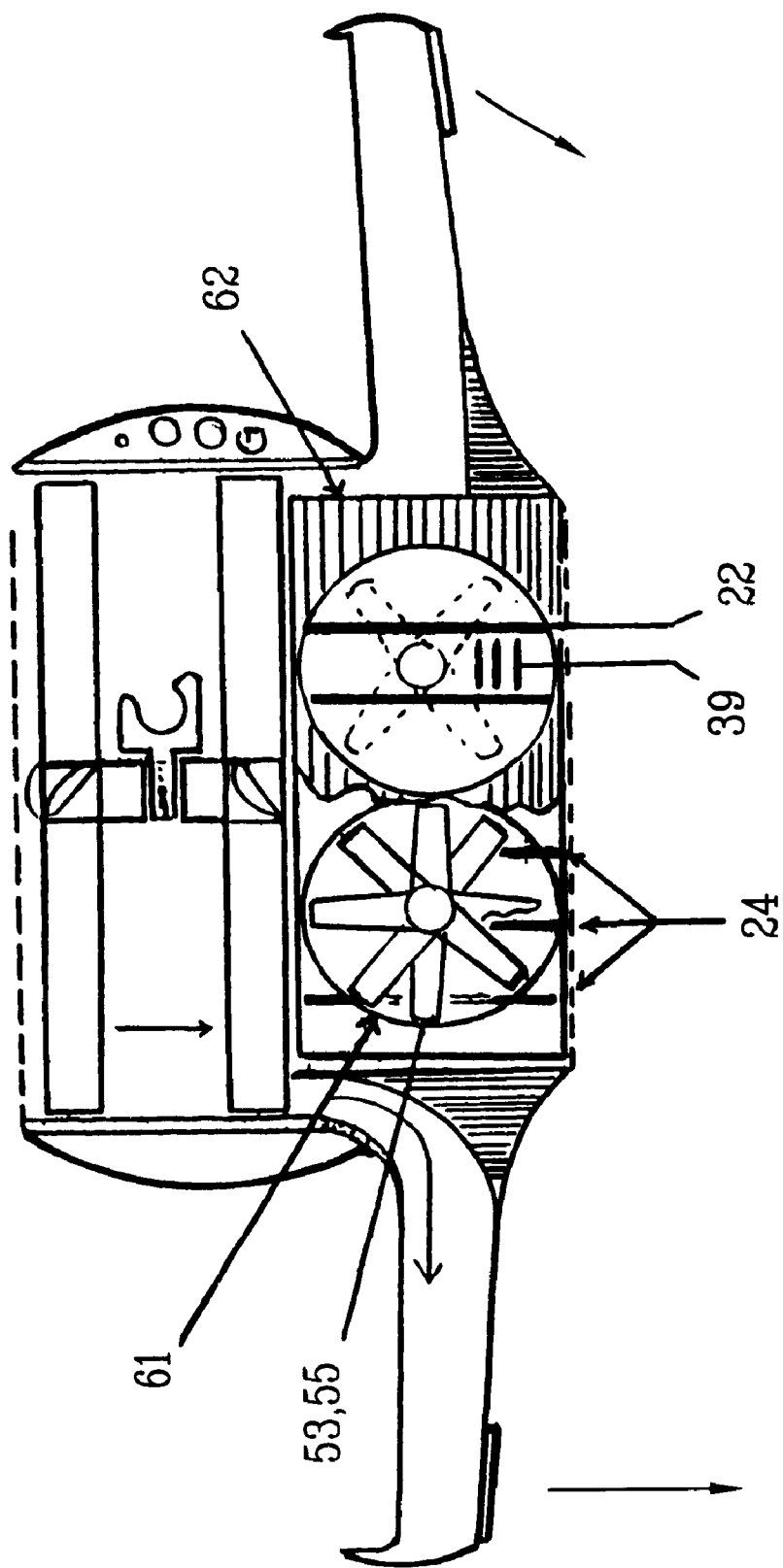
Figure 3:
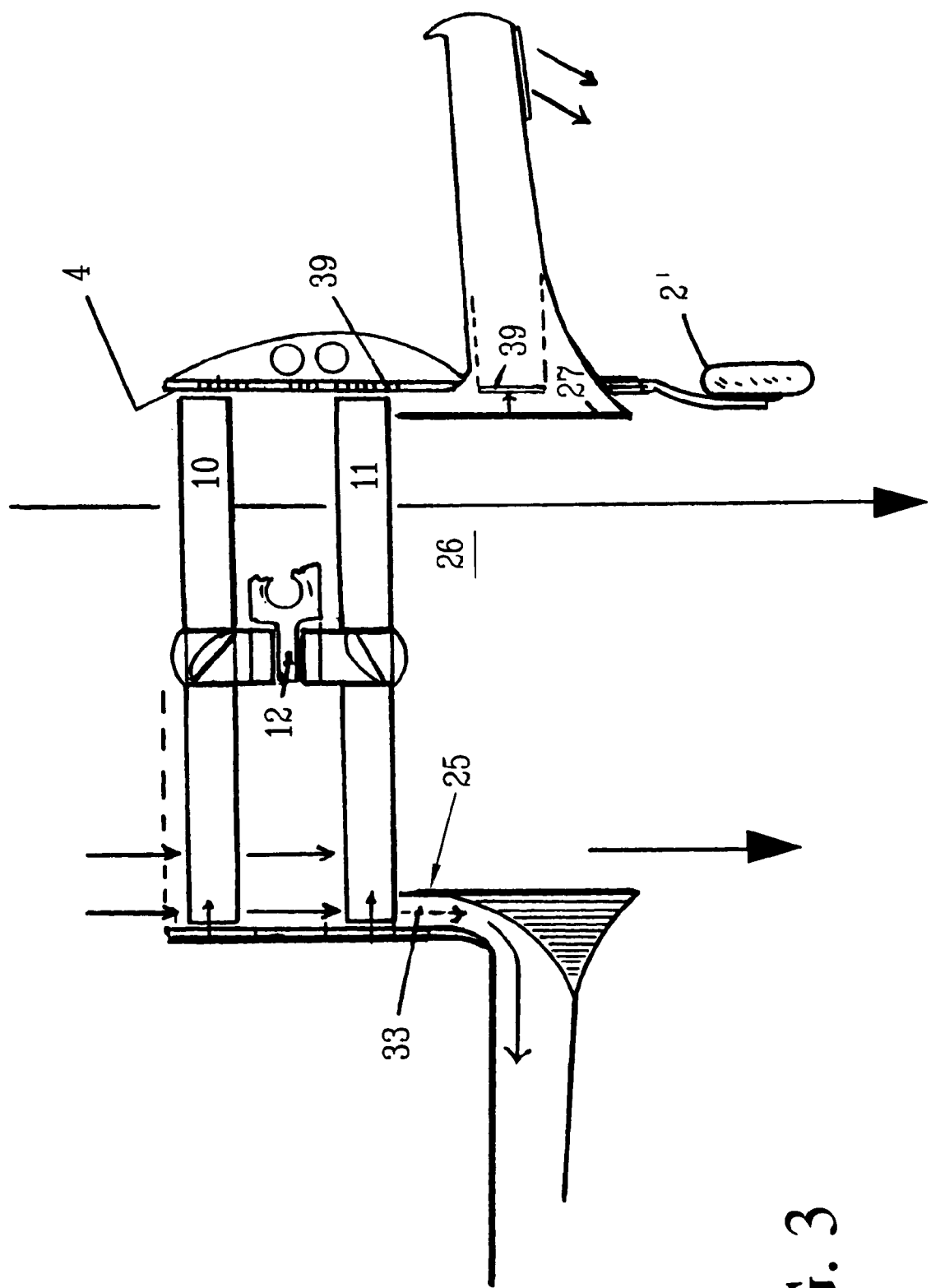
Figure 3A:
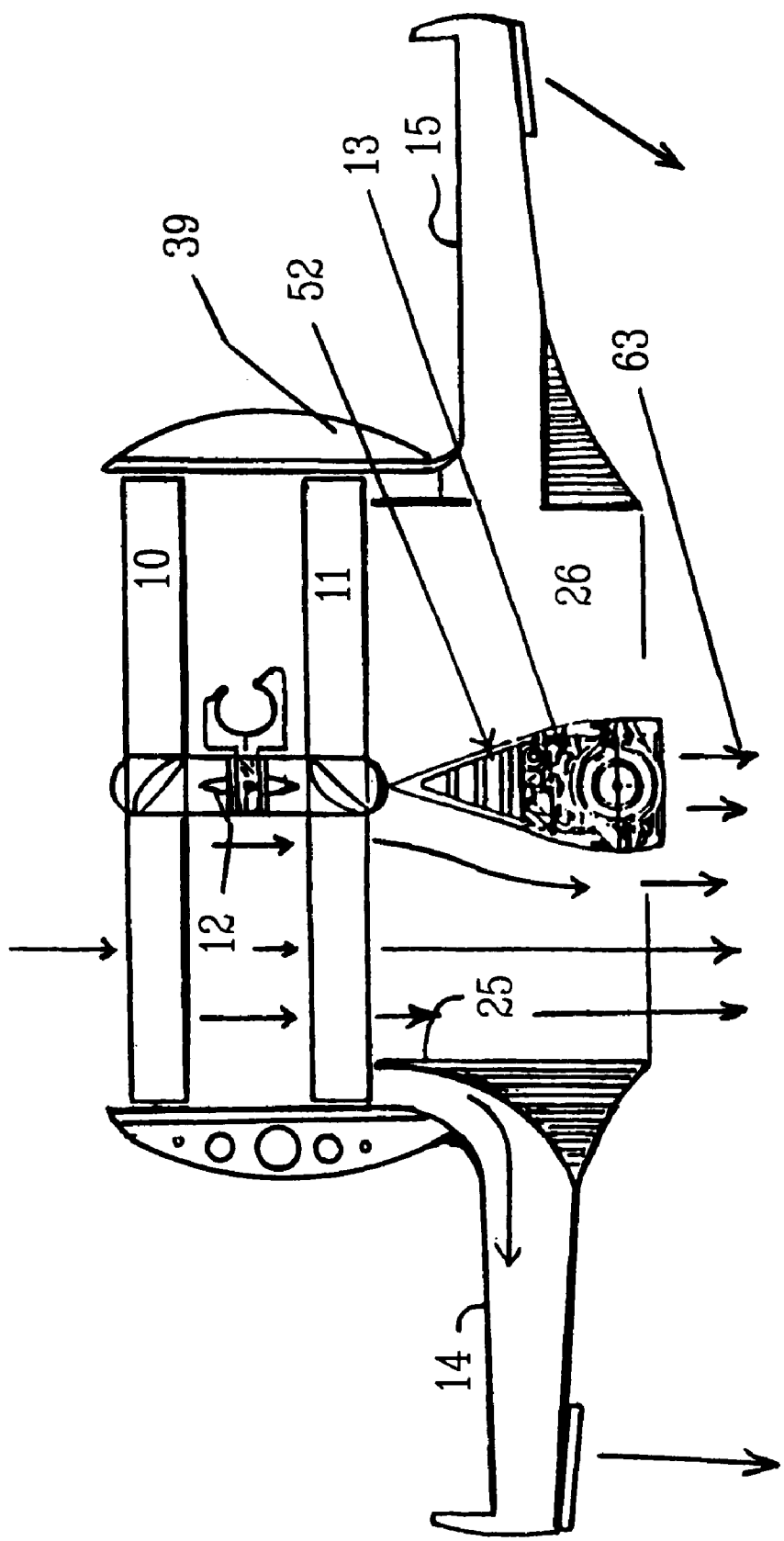
Figure 4:
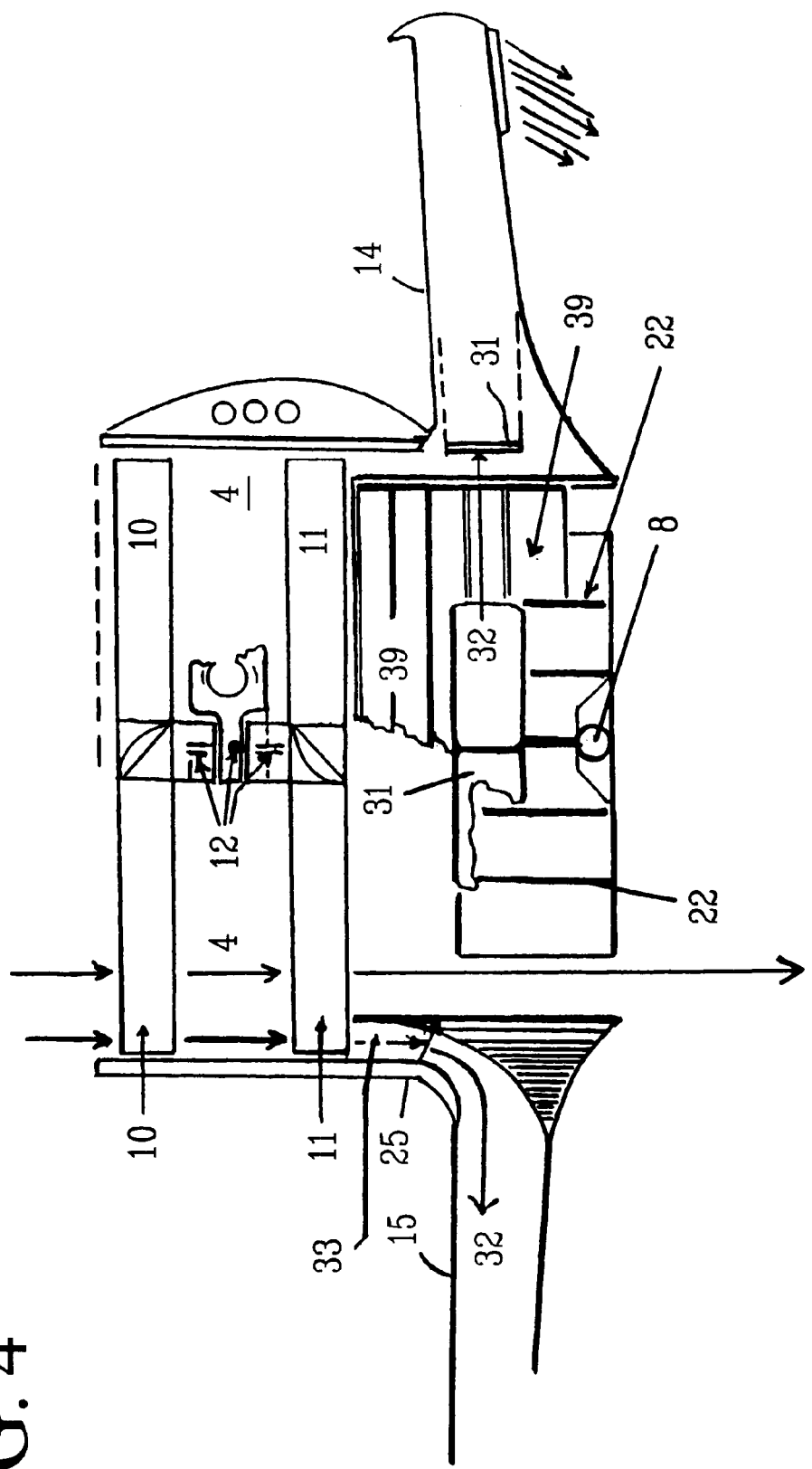
Figure 5:
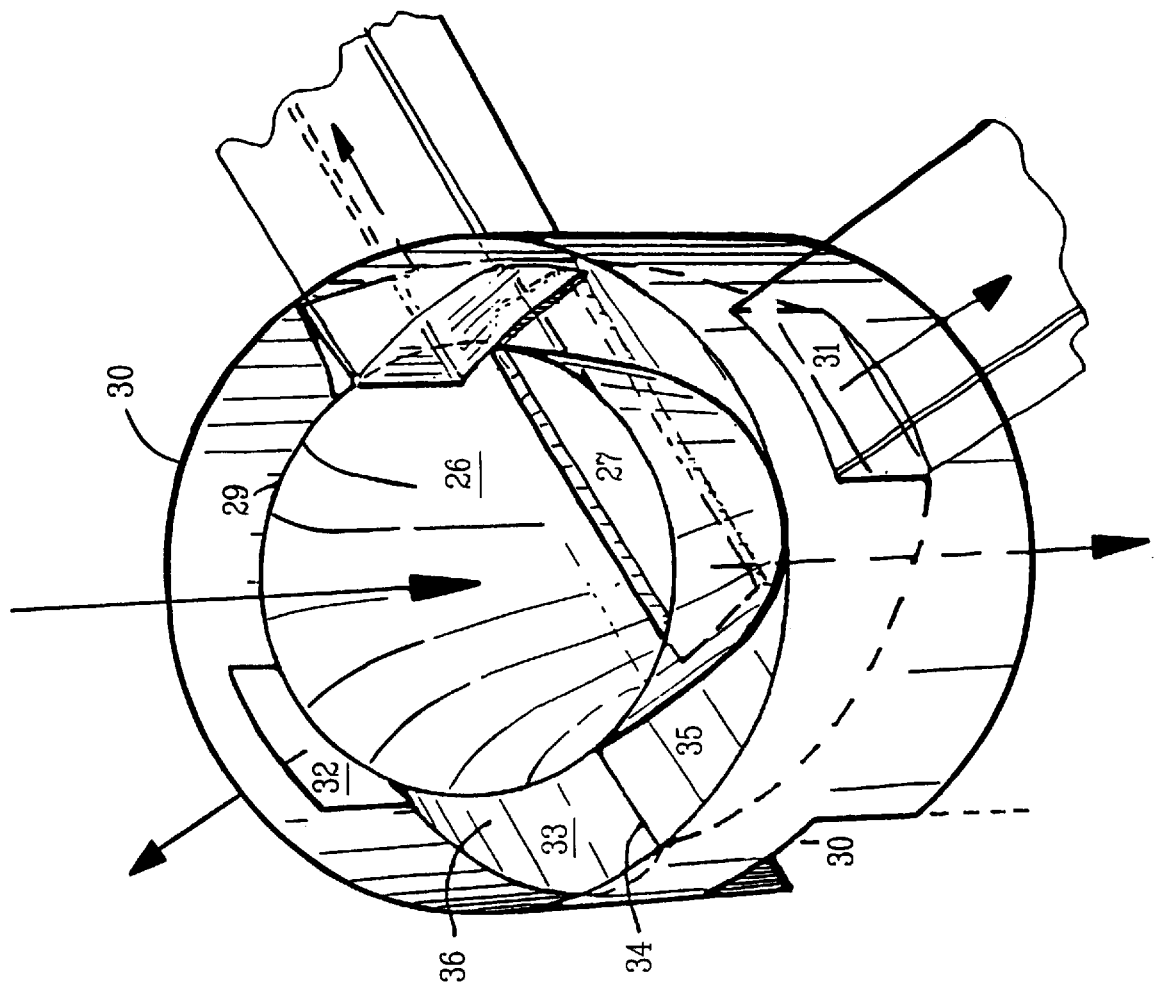
Figure 6:
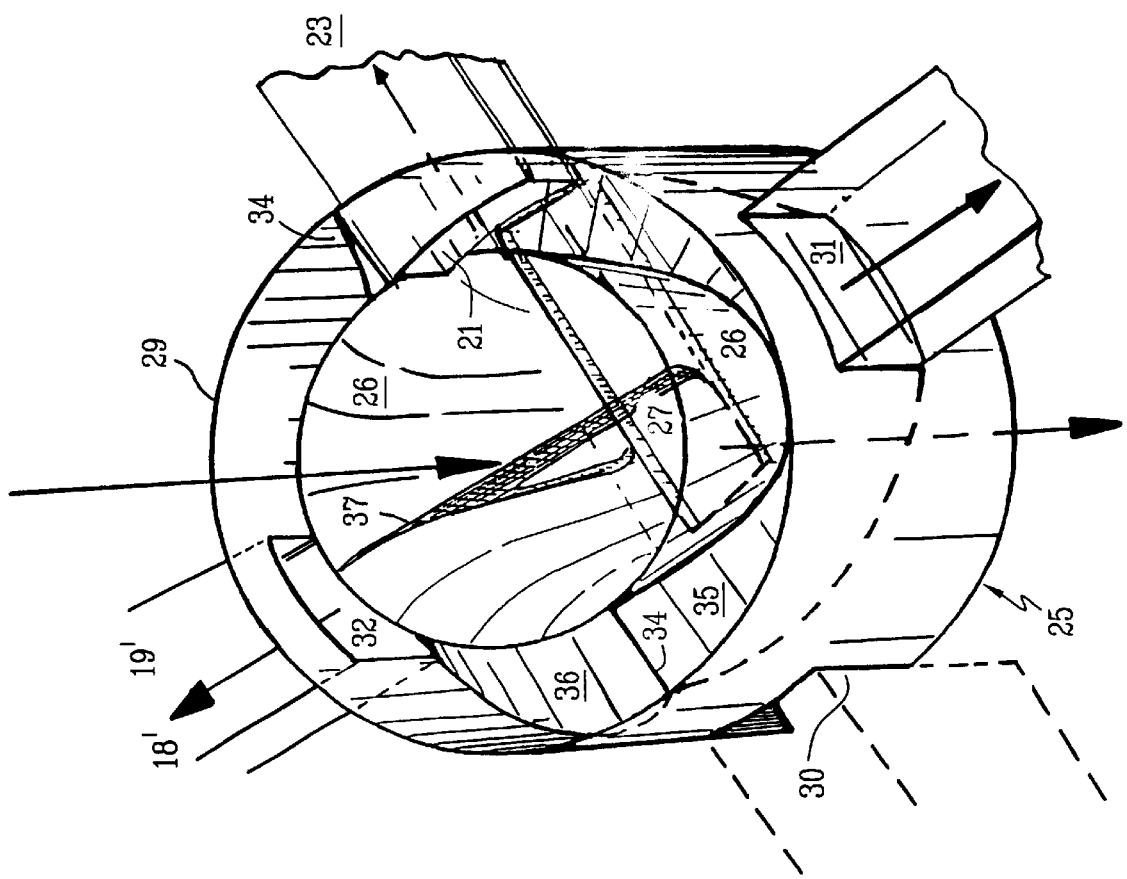
Figure 6A:
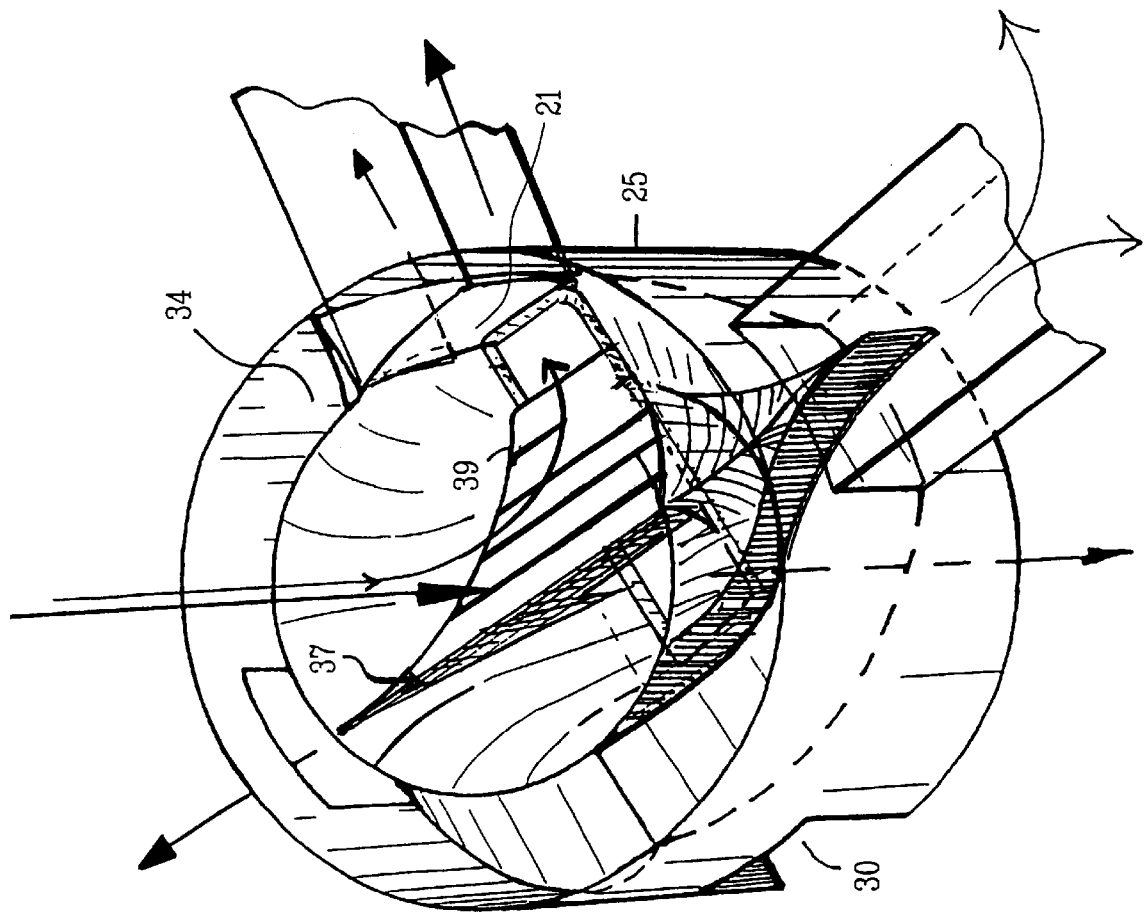
Figure 7:
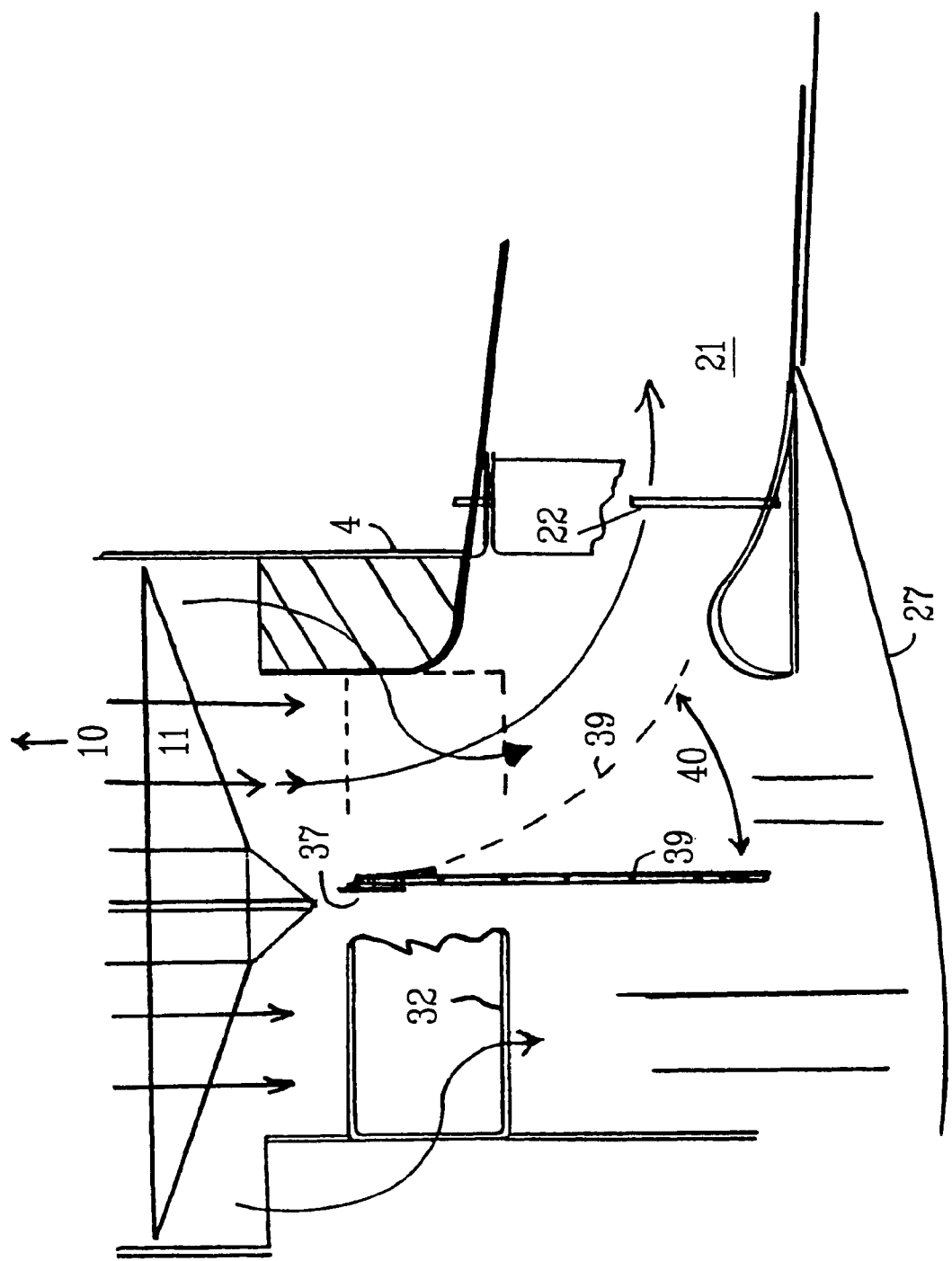
Figure 8:
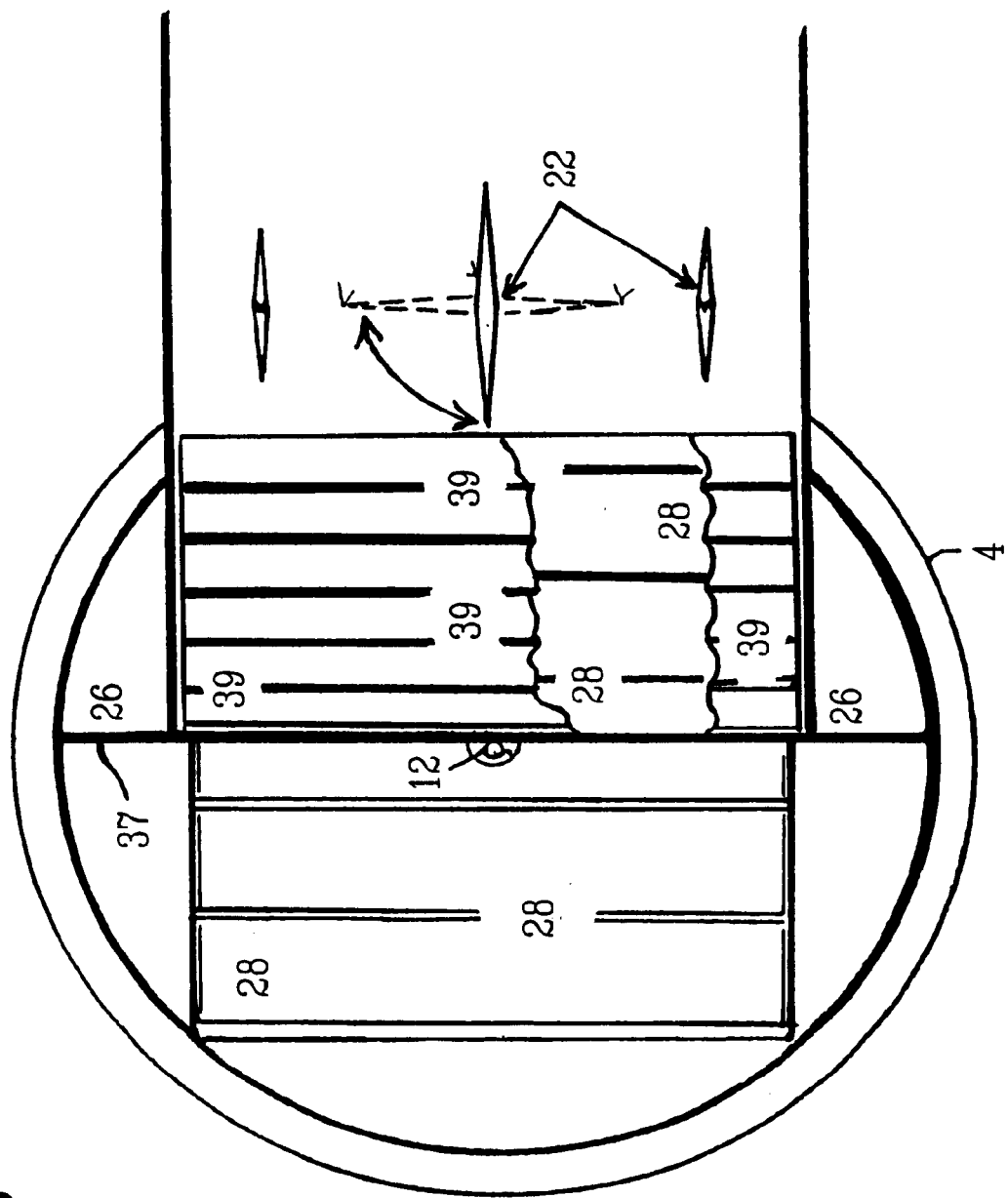
Figure 9A:
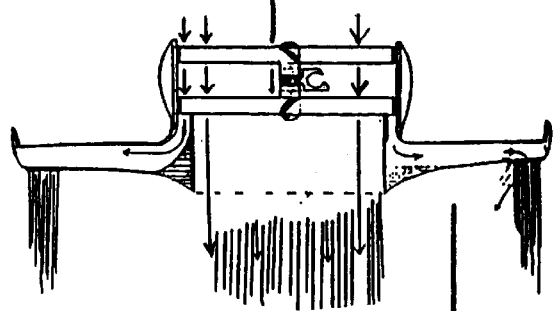
Figure 9B:
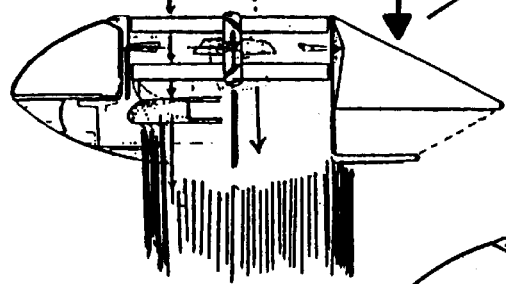
Figure 9C:
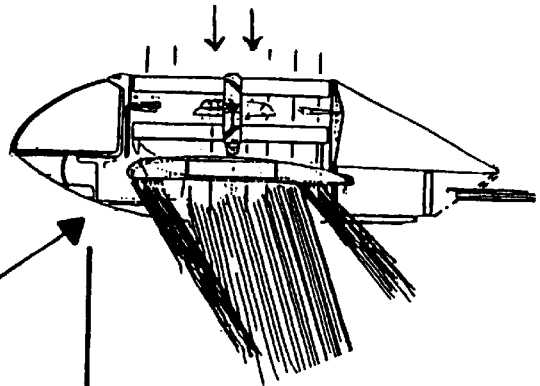
Figure 9D:
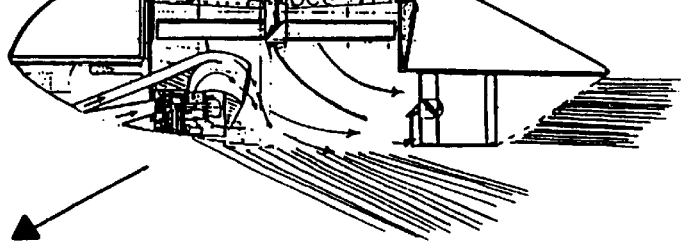
Figure 9E:
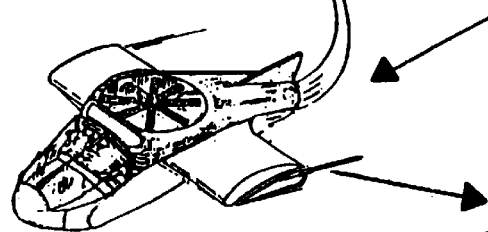
Figure 9F:
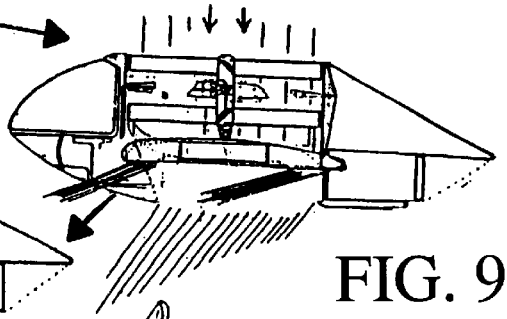
Figure 9G:
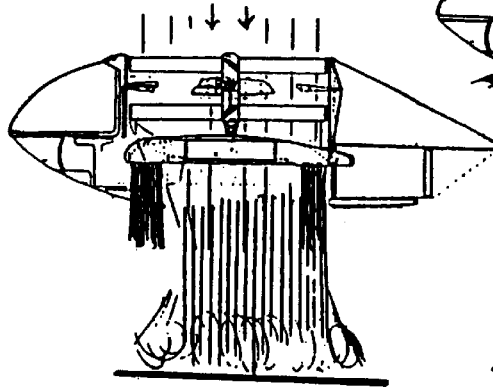
Figure 9H:
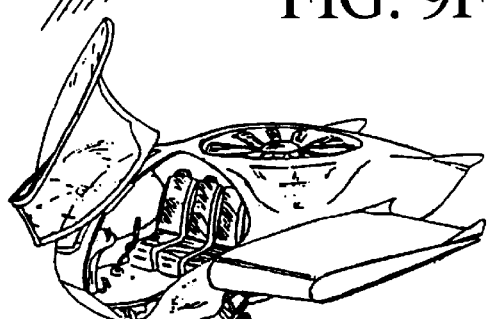
Figure 10:
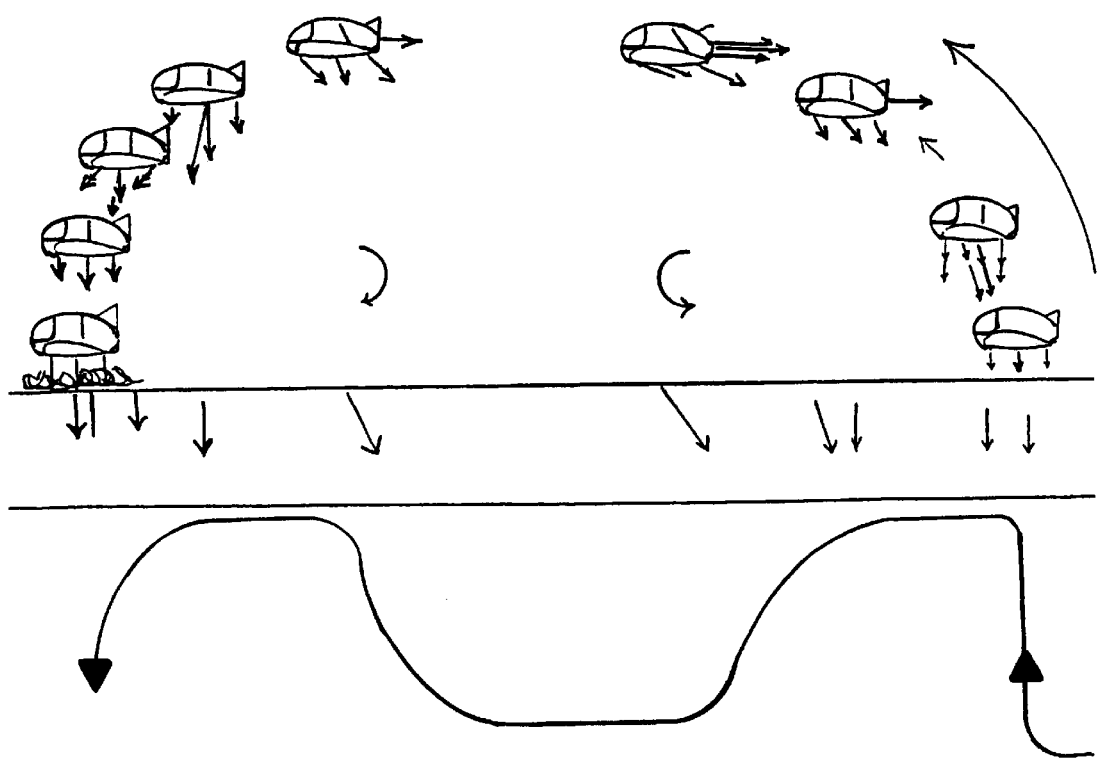
Figure 11:
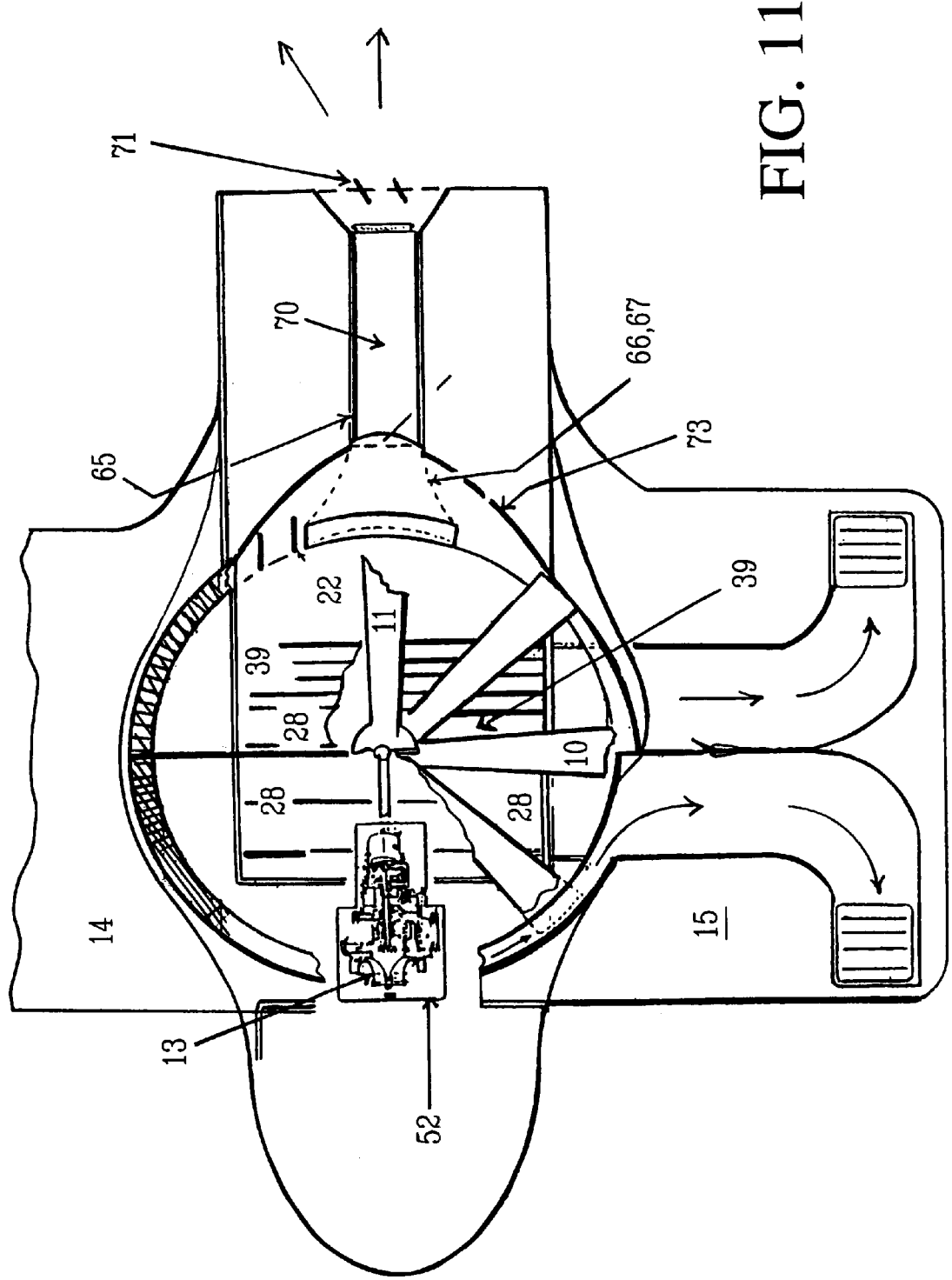
Figure 12:
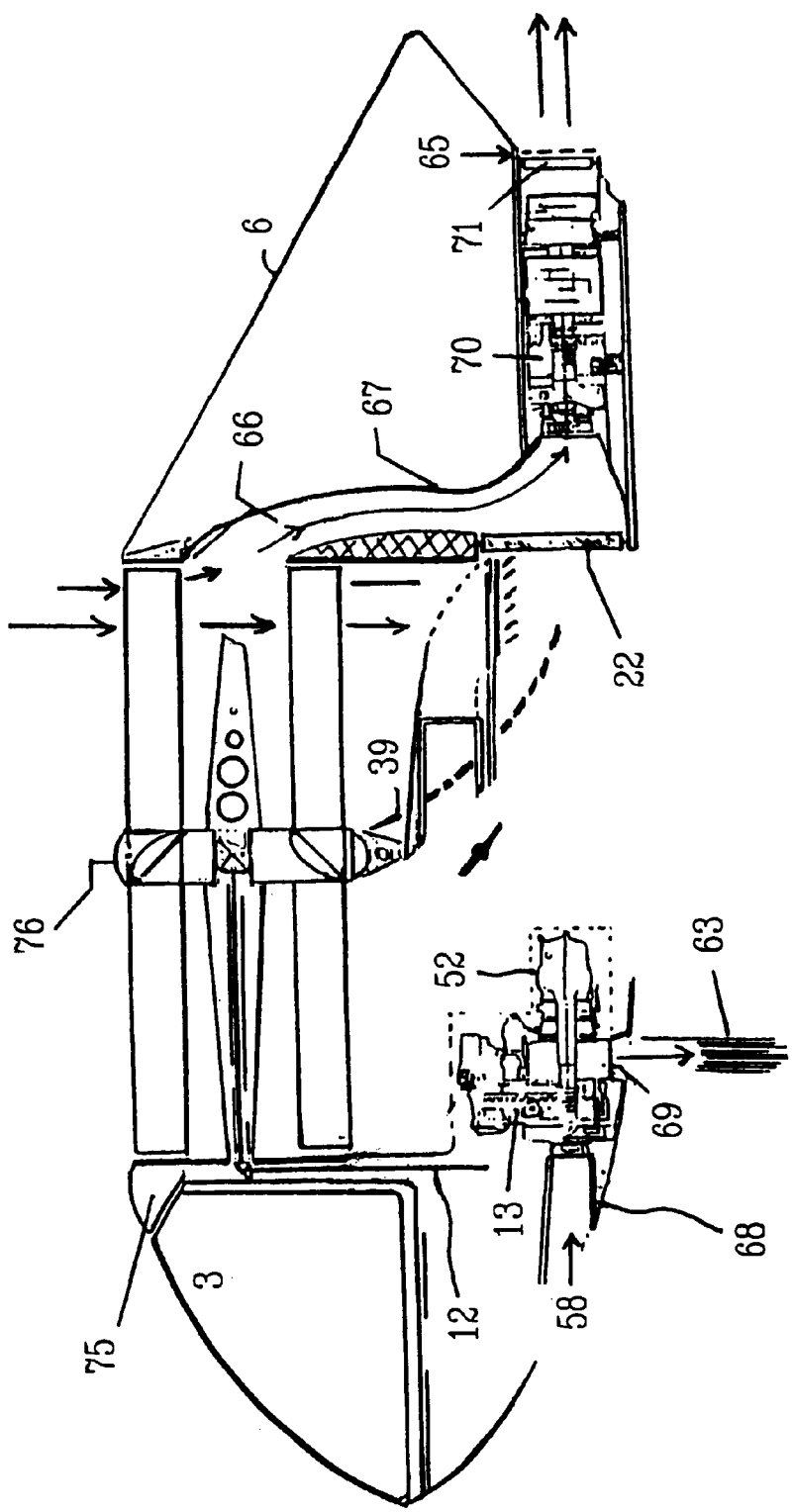
Figure 13:
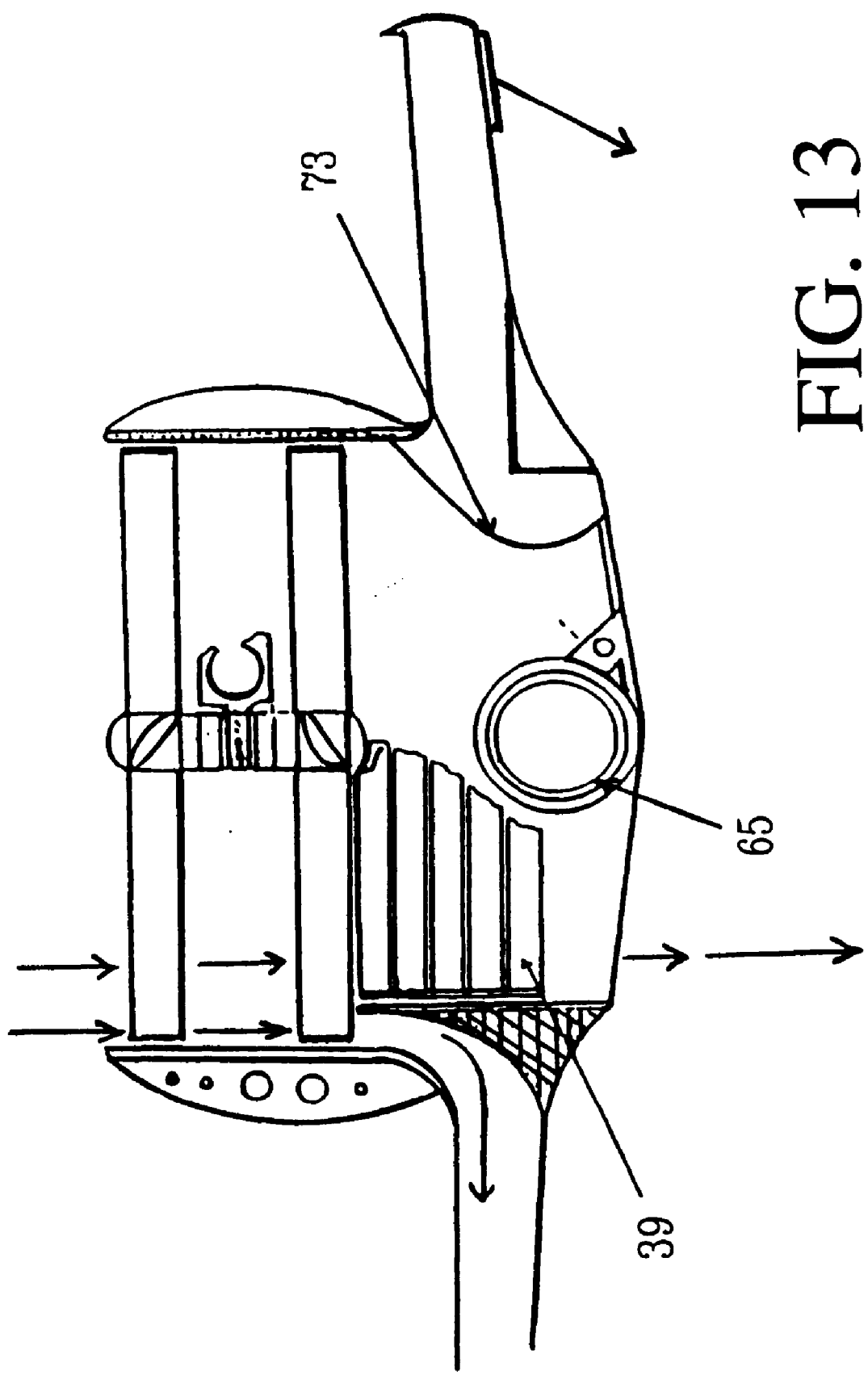
Figure 14:
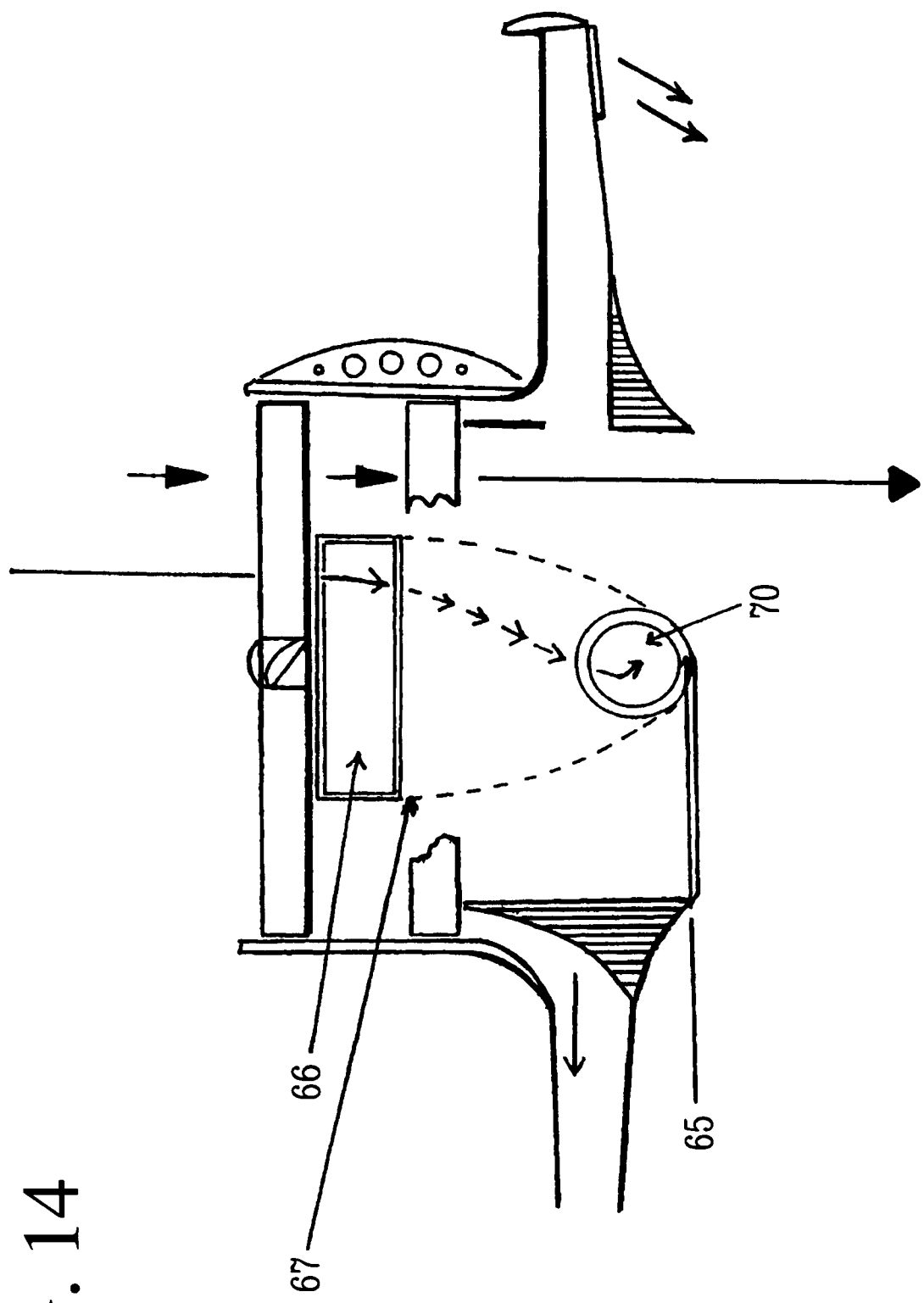
Figure 15:
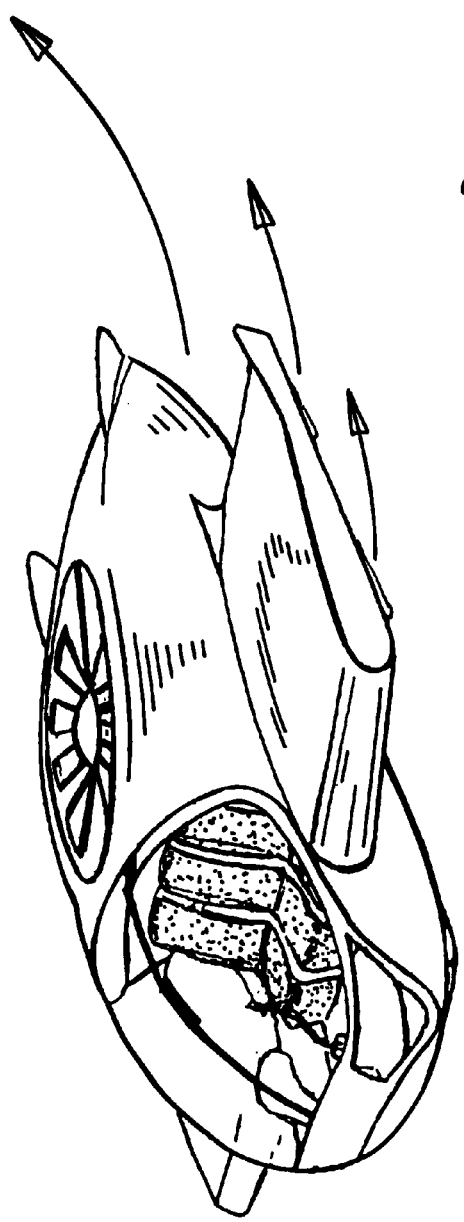
Figure 16:
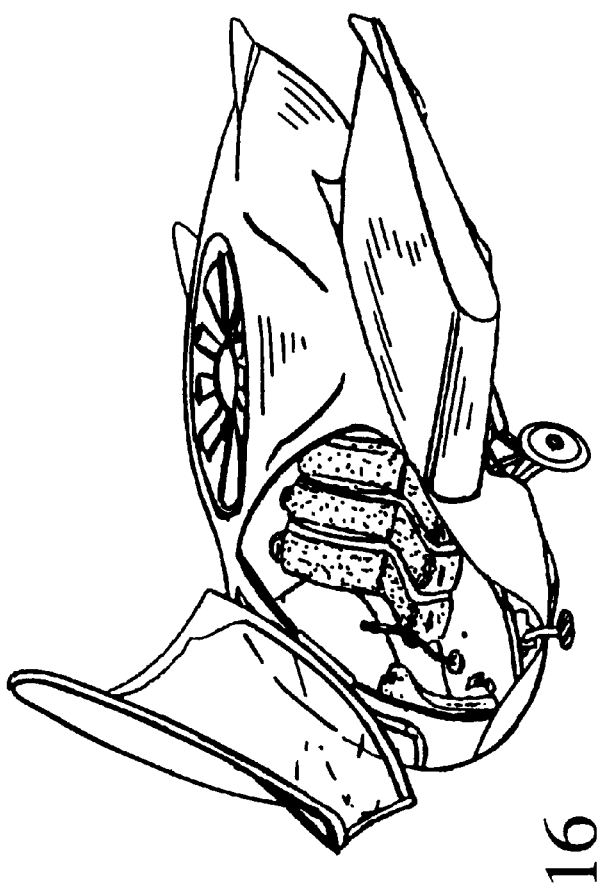

FIG. 1C is a view similar to FIG. 1B with partially cut away portions, except an adjustable nozzle at the rear is illustrated and is fed with air from a scoop provided to take air from the main air duct or air distribution means and direct it rearwardly for position or directional control whilst the aircraft is hovering or whilst executing vertical movements only, and two contra rotatable fan impellers are driven by gears and linkages from the engine to provide rearward thrust for forward motion;

FIGS. 2 and 2A are longitudinal partial sectional views on the line A—A of FIG. 1 showing deflector member (39) in vertical position and inclined deflecting position;

FIG. 2B is a longitudinal partial sectional view partly on the line A—A of FIG. 1 but wherein horizontally mounted rear control flaps are provided and illustrated the wing ducts and bottom deflectors;

FIG. 2C is a view similar to FIG. 2 but illustrating the jet turbo shaft engine and its inlets and outlets and power take-off linkages to drive the impellers;

FIG. 2D is a cut-away rear elevation of the aircraft, looking forward into the rear of the craft and illustrating the contra rotating vertical axis impellers and contra rotating horizontal axis impellers;

FIG. 3 is a partial transverse section on the line B—B of FIG. 1 through the impeller and its duct and the air distribution means in the wings;

FIG. 4 is an enlarged partial fragmentary detail through the vertical air duct and contra-rotatable impeller fans with beveled gear and drive shafts and in the left-hand part showing part of the distribution means leading to the wing ducts and in the right-hand part, showing the deflector flaps/louvres of the rear outlet but without the main part of the distribution means;

FIG. 5 is a perspective view from above of the air-flow distribution means without transverse central dividing wall and displaceable deflector;

FIG. 6 is a perspective view from above of the air-flow distribution means of FIG. 4 and including the feature of the dividing baffle wall but for clarity without the displaceable rear deflector wall thereagainst;

FIG. 6A is a view of the distribution means of FIG. 6 but with segmented rear air deflector wall raised to be in the rearwardly-air-directing position and also showing an aerodynamically shaped curved partial partition with upper curved water-shed-like top located in the chute and ducts leading to bottom outlet which in turn leads to the wing outlets;

FIG. 7 is a schematic section through the distribution means of FIG. 6A illustrating the segmented deflector moved for deflecting part of the otherwise downward flow rearwardly;

FIG. 8 is a plan of part of the distribution means illustrating in the left-hand part half of the air distribution means leading to the bottom outlet opening having horizontal deflector vanes, and in the right-hand half a displaceable and segmented rearwardly deflecting air deflector in its deflecting position and partially cut away in the lower portion to reveal more of the horizontal deflector vanes in the bottom air outlet;

FIGS. 9A, 9B, 9C, 9D, 9E, 9F, and 9G illustrate various operational conditions of the aircraft from vertical take-off to forward movement to stopping and vertical landing and FIG. 9H is as parked with front open;

FIG. 10 is a schematic illustration of the various control movements or conditions of aircraft as represented in FIGS. 9A to 9G with the bottom line representing the power output requirements of the engine which are automatically controlled;

FIGS. 11, 12, 13, 14, 15, and 16 schematically illustrate an alternative embodiment of aircraft according to the invention where a horizontal hot air jet is provided in the tail section and is independent of the lift engine and facilitates a more controlled landing in the event of failure of the lifting engine, and in which;

FIGS. 11 and 12 are views similar to FIGS. 1 and 2C but wherein the two engines are provided—the front jet turbo shaft engine having been turned so the exhaust goes down since there are now no rear contra impellers and a rear jet engine replacing the previous contra rotating impellers rotating about horizontal axes of the earlier embodiment;

FIG. 12A is a view similar to FIG. 3 but looking forward and showing the engine;

FIG. 13 is a fragmentary part cut-away section looking forward and showing the rear jet engine;

FIG. 14 is a vertical section similar to FIG. 13 but illustrating the air inlet to the rear engine; and FIGS. 15 and 16 are perspective views illustrating the aircraft as it might be in flight and parked with the cockpit cover raised for access.

DETAILED DESCRIPTION OF THE INVENTION

A personal vertical take-off aircraft 1 is illustrated in the drawings in FIGS. 1 to 10 and is suitable for shorter journeys for example, for business commuting, and comprises a fuselage 2 with undercarriage and wheels 2' and with a cockpit or pilot cabin 3 at the front thereof with glass or plastics window/dome, and rearwardly thereof a vertical air duct 4 having an upper main inlet 5 protected by a grill 6 through which air passes to impellers 10,11. Grill 6 protects the impellers etc., from damage by undesirable intake of objects such as birds.

A pair of contra-rotating ducted fan impellers 10,11 with carbon fiber blades are located in the duct 4 and rotatably driven about a vertical axis via a double drive shaft linkage (12,12') leading via a bevel gear to a high powered lightweight, turbo shaft engine 13 located low down in the aircraft fuselage 2 for stability purposes i.e. generally beneath the normal level of downward outlet openings (16' etc.) in the wings as will be described. The rear body part 6' is provided for streamlining purposes.

An air-flow duct 21 leads rearwardly from the vertical duct 4 from an air distribution means 25 and has flow control flaps 22 controllably pivotable about vertical axes and operable to close the flow in main rearwardly extending duct 21 during landing and take-off but openable to permit air-flow rearwardly to the rear outlet 23 in which vertically mounted and pivotal deflector blades 24 are mounted for directional control to one side or the other. The blades 24 are pivotal about the vertical axes in FIGS. 1, 1A, 1B to enable left and right directional steering. A scoop 7 is provided in duct 4 and particularly in the passage in the air distribution means 25 which optionally leads to the bottom outlet or the rear duct 21 and above the rear end of deflector device 28 in its raised position. In such raised position of 39, very little air will flow through scoop 7 because of the greater resistance. The scoop 7 leads to a duct 8 extending within rear duct 21 and having at its end at the outlet of duct 21 an adjustable nozzle 8' provided for lateral directional control of the aircraft when hovering or undertaking only vertical movements.

The scoop 7 which is transverse air flow leads to duct 8 extending to the rear and reducing in size to increase the air velocity which is expelled out of a controllably adjustable nozzle 8' to enable directional control whilst in the hover mode. This direction control for the hover mode will be referred to later as a "puffer device" for simplicity.

To provide for increased rear thrust, two contra-rotating impellers 53,55 are provided rotatable in side-by-side located cylindrical impeller ducts 61 in duct housing 62 in the rear duct 8 rearwardly of the flaps 22 and driven via drive shafts 59 and gears from the output shaft of engine 13. The engine cover 52 is provided as a shaped cowling to exit into the main downward air flow for cooling. The top of the cowl 56 is a heat sink provided to dissipate heat from the exhaust which is then curved around and deflected into the main airstream from intake 57 as shown in FIG. 2C. Cooling air is fed thereto and led over the cowl surfaces. The exhaust of engine 13 (normally a turbo jet shaft) is directed to be in the same direction as the incoming cold air and forms a vacuum/pressure reduction to draw air in—assisted by the ram effect. An intake duct 58 is provided for the engine 13. The exhaust from the turbine engine 13 combines with the cooling air intake and flows into the main downward airstream.

A wing 14,15 of aerofoil section and curvedly tapering to straight outer edges 14' extends from each opposite sides of the fuselage 2 in symmetrical manner and may have control flaps etc., as is known (not shown). Two air ducts 16,17 and 18,19 extend from vertical duct 4 along each wing 14,15 respectively and terminate in the lower surface of the wings 14,15 in downwardly directed wing outlets 16',17',18' and 19' which have flow directional control means 20 as will be described. The wings 14,15 are pivotal about axes to enable garage storage.

The downward air-flow from impellers 10,11 reaches air-flow distribution means 25 (see FIGS. 5 to 6A especially) which forms part of the vertical duct 4 and comprises a central passage 26 with converging portions contoured curvedly to provide an aerodynamic smooth transition and leading to rectangular bottom air-flow outlet opening 27 in which a plurality of horizontal deflector vanes 28 (not shown in FIG. 5) are mounted pivotable about horizontal axes transverse to the intended normal direction of the movement of the aircraft 1. A cylindrical wall 29 extends from at least the upper region of the walls defining central passage 26 and has spaced therefrom a further cylindrical co-axial wall 30 having two opposite outlet openings 31,32 leading to the ducts 16,17 and 18,19 respectively extending along with the wings 14,15 to the forward and rearward outlet openings 16',17';18',19' in each wing which are downwardly directed and also have air deflectors 20 preferably in the form of foils or blades 20 mounted therein about horizontal axes with a similar movement as louvre windows and parallel to the wings or at least transverse to the general direction of movement and operable together in each outlet as will be further described and by control means (not shown). A front passage 30' is provided for the drive linkage 12 and also location of the engine.

The outer air deflection region 33 of the distribution means 25 is divided into two halves by a "watershed" or dividing part 34 downwardly from which extend two downwardly curvedly inclined helter-skelter like wall portions 35,36 leading to outlet openings 31 and 32 respectively in turn leading to the ducts 16,17 and 18,19 in the wings 14,15. The wall portions 35,36 are also each inclined radially outwardly and downwardly from wall surface 26' and gradually and gently deflect and direct air-flow to outlets 31,32 leading to the wing outlets to ensure energy and reduce noise.

It is envisaged that perhaps 93% of the main air-flow will flow to outlet opening 27 and the remainder down the spiral. In the flow to the wing outlets there are provided controllable dampers or flaps 41,42 for forward and rear thrust bias for causing more or less air flow to the wing outlets as desired.

In the arrangement shown in FIG. 6, a central dividing wall 37 is provided vertically located in the central passage 26 dividing such into front and rear outlet portions and has a closing and air deflector means 38 preferably in the form of a segmented deflector member 39 optionally displaceable from the position, in which it does not deflect air (vertically downward in FIG. 7) and allows air to flow vertically downward to outlet 27, and displaceable into a deflected, curvedly inclined and sloping position as indicated to right of displacement indicating arrow 40 wherein half of the air or a proportion of the air is directed to the rearwardly extending duct 21 and outlet 23 for assisting forward motion—said rear outlet 23 also having the plurality of horizontally pivotally mounted deflector vanes 24 controlled as desired. Member 39 is suspended from the top of dividing wall 37 and may comprise a plurality of strips of relatively rigid material hingedly interconnected to enable deflective displacement means (not shown) to operate. Member 39 is dimensioned so as to reduce in width towards its free, lower end so that when in its rearward air deflecting position it fits closely to the faired or curvedly aerodynamically shaped converging walls 26' to ensure a proper smooth air flow redirection.

It will be appreciated from FIGS. 2 and 3 that the engine 13 is located below or substantially below the level of the downwardly directed outlets 16'–19' and of the wings 14,15 or at least a major proportion thereof so that it acts as a keel to provide stabilising to the whole aircraft structure and the whole flying characteristics of the vehicle.

In FIG. 2A flaps 22' are illustrated in an alternative cut away to open/close the secondary rearward duct 8 to form said "puffer" device or spin preventive device taking-off some of the downwardly direct flow is provided to control rotation or counter any tendency of the fuselage to rotate whilst in the hover mode.

FIGS. 9A–9G illustrate the various operational conditions of the aircraft from take-off to landing and 9H is in the parked condition.

In FIG. 9A take-off is illustrated where maximum revolutions of the engine are used and the vanes or deflectors 20 in the wing outlets 17–19 and the deflectors 28 in the bottom outlet are normally in a position so as not to interrupt the downward vertical flow of air although may be controlled such by computer control (not shown) to ensure stability.

In FIG. 9B once the desired vertical height has been reached, the deflectors 28 in the bottom duct 27 are rotated rearwardly so as to direct a portion of the main air towards the rear and cause slight forward motion as illustrated. In FIG. 9C with increasing forward motion and possibly decreasing engine revs the deflectors 20 in the wing outlets 17'–19' are rotated so as to deflect the air jets rearwardly to act to supplement the forward drive and by opening flaps 22 to passage 21, air-flow may be directed out of the rear outlet 23 to contribute toward forward proportion. In such situation the lift resulting from the action of air passing over the aerofoil shape of the wings 14,15 contributes to the maintaining of the aircraft airborne. After valve flaps 22 open, the rear engine drive shaft is clutched-in to provide power to the two impellers in the tail shaft for rear thrust.

In FIGS. 9D and E possibly at perhaps in excess of 240 mph (160.9344 km per hour), the engine revs will have been reduced by possibly 75% and all the deflectors are at 10° to the horizontal to give optimum forward propulsion—those in the rear outlet may be horizontal so that there no hindrance is given although where vertical deflectors are also or alternatively preferably provided, such give a directional steering possibility. For the longer range embodiment described later e.g. for city-to-city travel,speeds in the region of 350 mph might be expected.

In FIG. 9F when it is desired to slow down, the deflectors 20,28 may return to close to vertical disposition or forwardly directed. In FIG. 9G a neutral or hovering condition is shown with downward vertical thrust occurring at, say, 75% of maximum rpm from all the wing outlets 20 and the main central outlet 27. In FIG. 9F the slowing down portion prior to hovering or vertical landing is illustrated with wing outlet deflectors 20 are inclined forwardly to direct air-flow downwardly and forwardly to slow down the aircraft and deflectors 28 vertical. In FIG. 9G the wing deflectors 20 are returned more towards vertical and the engine revs decreased to enable the aircraft to gradually descend and then the engine revolutions of the engine are further decreased to achieve landing.

The contra-rotating impellers/fans are provided to overcome any torque problems and to avoid the need for stabilising propellers as are used in helicopters.

It will be appreciated that there is always a downward thrust through the main outlet opening to provide lift for the aircraft until it is caused to move forwardly by the thrust from the wing outlets which creates a lift effect and thus the transition from vertical to horizontal travel can be achieved easily and readily with stability.

Suitable control means will be provided for the engine 13 and deflectors 20,28,22,24.

The provision of the propulsion duct 21 contributes towards the forward movement and the deflectors 24 facilitate steering.

The aircraft may be made of carbon fiber and the engine is preferably a lightweight high performance engine with suitable cooling means. The location of the engine low down in the fuselage provides considerable improvements for stability as does the location of the pilot cockpit at relative low position relative to the fuselage and the rest of the aircraft.

Regions between constructions within the fuselage and the outer shell may form a double skin arrangement which can act as a buoyancy aid and may be filled with foam material as is known. Suitable reinforcing ribs may be provided.

The aircraft provided is stable in operation and quiet and uses cold air-flows for downward thrust and is simple and economical to produce. The aircraft is much quieter than a helicopter in horizontal hover.

A parachute arrangement for controlled landing of the aircraft and occupants in the event of engine failure is envisaged. In the subsequently described embodiment for longer range e.g. city-to-city travel, an additional jet engine with rear thrust would enable landing in conventional manner if the rotor/down thrust engine should fail.

The use of a single engine is highly desirable and modern turbo shaft engines provide high power and speed at economy and great reliability. The gap between the propellers and the duct is preferably 5% of the diameter of the duct.

A contra-rotating system comprises two single stage opposite handed impellers rotating in opposed directions in the duct without guide vanes provides considerable advantages compared to a single stage system, namely:

(1) The contra-rotating system develops approximately 2–3 times the static pressure of a single stage impeller system of the same diameter and speed.
(2) The two-stage system uses 5.10% less power and is quieter than a single stage system producing the same work at the same diameter.
(3) A two-stage system delivers a parallel non turbulent air stream, contrary to a single stage impeller which has a rotating turbulent air stream.

In operation the air flow can be regulated by idling one stage. A flow reduction of 35% and a power reduction of 50% is possible without losses.

If necessary more stages can be added if pressure demands are higher than a two-stage system can meet.

Control means, preferably a computer control means (not shown), will be provided and activated by the pilot moving the joystick or control column.

The automatic operation of the computer controlled control system briefly schematically illustrated with reference to the flying modes illustrated in FIGS. 9A–G.

The controls will operate such that the pilot cannot miss out a vital stage in the flight control as such will be ensured by the computer control.

The operational characteristics of this aircraft will be unlike any other plane.

The control stick and its effects are most important and one unlike any other in action.

Apart from the revs of the engine controlled from the stick none of the mechanisms (vectors, deflector etc.,) necessarily work in real time i.e. the computer will override any dangerous instruction for safety—stability, all operations proceed to cycle in their own time—referring to and controlled by on-board sensors.

In the alternative embodiment illustrated in FIGS. 11–16 having a second engine and intended for travel over greater distances e.g. for city-to-city flight, those components which are the same or similar to the embodiments of FIGS. 1 to 10 have the same reference numerals whilst the new features commence with reference numeral 63' which represents the exhaust of a turbine engine 52 which is now inverted in comparison to the previously described.

To accommodate the second engine (jet engine 70) a housing 65 is provided and a duct 66 for creating a forced air draught is provided (FIG. 12) to feed the jet engine when idling prior to flaps 22 being opened and deflector 39 being deployed. The trunking 67 of the duct 66 is shown in outline. (The forward turbine engine 13 has a downwardly directed exhaust nozzle). Ceramic or graphite rudders 71 are provided in the jet stream of engine 70. The trunking 73 is of fuller width forwards, tapering to inlet 72 of the rear jet engine 70—air is supplied from the deflector by flaps 27. One or more additional guide vanes 74 are provided in FIG. 2.

It will be a commercial necessity for the engine or engines to be quality, powerful engines with world wide servicing already in place. A typical suitable lightweight engine would be a Rolls Royce Allison C30 turbo shaft or a turbomececa equivalent.

Wind tunnel tests at this time show the required minimum air flow of 500.000 CFM (3500 lbs thrust) for the main duct as described. Rather more than 50.000 CFM for the dedicated rear thrust has been achieved plus base and wing tip rear thrust, plus residual base thrust partly deflected rearwards. This amounts to 70000 CFM rear thrust with the main impellers almost at idle.

A parachute compartment 75 is provided as is a parachute cable anchoring point 76 under recessed covered strip in the roof. A knife edged impeller support is provided to the main box section frame (not shown). It will be readily apparent when considering how the evidence of FIGS. 1–10 operates as to how the additional engine 70 will be operated to provide rearward thrust when necessary.

What is claimed is:

1. A vertical take-off and vertical landing aircraft comprising an aircraft body including at least one wing on either side of the aircraft body to provide lift for the aircraft during forward movement, a normally vertically or substantially vertically extending main air duct extending through the body and having at least one air inlet at the top and at least one air outlet at the bottom, impeller means located in said duct and operable to create a downward flow of air and comprising two oppositely rotatable impellers driven to rotate about a vertical or substantially vertical axis within said duct, wing ducts extending from air distribution means to extremities of the wings and exiting in a downward direction and extending to spaced apart regions in each wing for stabilization, a rear air duct leading to the rear of the body with an air outlet for optionally contributing to forward propulsion and directional control, and wherein air is directed from the impeller means to an air distribution means located beneath the impeller means, said distribution means enabling some of the air-flow to flow through said wing ducts and some to flow through said rear duct, an engine connected to drive said impeller means, and control means for controlling air direction or deflection at the outlet of each of the wing ducts and at the bottom outlet duct and at the rear outlet.

2. An aircraft as claimed in claim 1, in which there is provided control means for controlling air direction at the outlet of each of the wing ducts and at the bottom outlet duct and optionally at the rear outlet for forward movement; and wherein the air distribution means and control means are such as to enable a smooth transition between hovering or only vertical movements, where only downwardly directed air is used, and forward movement wherein some of the displaced air is discharged out of the rear duct to cause forward motion such as to achieve flight as a result of the lift provided by the wings and without reorientation of the impeller means.

3. An aircraft as claimed in claim 1, in which the engine is a lightweight turbo shaft engine.

4. An aircraft as claimed in claim 1, in which the engine is located beneath a normal level or substantially beneath a normal horizontal plane or level in which the wing outlets lie so as to enhance the stability of the aircraft.

5. An aircraft as claimed in claim 4, in which said scoop or ram inlet comprises an aperture portion or part provided in an upwardly extending part of the fuselage above the impeller or fan and which acts to receive forced air draught when the aircraft is moving forwardly in the manner of a ram effect to provide a forced air intake which will enable the power drive to the impeller to be reduced during forward travel.

6. An aircraft as claimed in claim 1, in which the air inlet is covered by a grille or mesh.

7. An aircraft as claimed in claim 1, in which at least the aircraft pilot seat is in a position forwardly of the impeller duct.

8. An aircraft as claimed in claim 1, in which the outlets in the wings and the outlet at the bottom have air deflection means so as to enable the flow of air therepast to be directionally adjusted and controlled so that transition from vertical direction to forward direction is possible by deflecting the air stream rearwardly or the transition from forward direction to vertical direction is possible by deflecting the airstream forwardly and downwardly.

9. An aircraft as claimed in claim 8, in which the air deflection means comprise a plurality of parallel normally horizontally disposed deflector blades or foils pivotable together about substantially horizontal axes.

10. An aircraft as claimed in claim 9, in which horizontally disposed, pivotal deflectors are controllably located in the rear outlet duct for side to side directional control.

11. An aircraft as claimed in claim 1, in which the vertical air ducting means has lower part beneath the impeller means and a lower converging central portion leading to an elongate rectangular slot and in which air deflectors are located with the main axis of the slot i.e. the longer sides, running fore and aft relative to the extension of the fuselage in the normal direction of forward travel.

12. An aircraft as claimed in claim 1, in which a lower part of the main air duct forms the air distribution means.

13. An aircraft as claimed in claim 11, in which the air distribution means includes said rear air duct running from the normally rear side of said converging central portions when provided to the rear air outlet.

14. An aircraft as claimed in claim 11, in which the lower part is divided by a baffle wall centrally transverse to the aircraft body.

15. An aircraft as claimed in claim 14, in which the baffle wall has an optionally displaceable flap or deflection or closure means associated therewith and operable so as to deflect some air as desired instead of going downwardly for vertical lift, but rather so as to flow rearwardly to the rearwardly directed air duct to supplement the forward propulsion and/or left and right movement control.

16. An aircraft as claimed in claim 1, in which around a flow-dividing wall of a lower part of the main duct there is an outer, duct-defining wall having outlet passages for the flow of air to the wing ducts on either side and forming part of the air-flow distribution means.

17. An aircraft as claimed in claim 16, in which the flow-dividing wall comprises the outer upper cylindrical wall portion of said central duct.

18. An aircraft as claimed in claim 17, in which the duct-defining wall is cylindrical and concentrically located.

19. An aircraft as claimed in claim 17, in which the outlet passages of the duct-defining wall are diametrically opposed.

20. An aircraft as claimed in claim 1, in which two wings are provided and to ensure a smooth and efficient division of air to the ducts in both wings and the bottom of the main duct, the space between the inner and outer walls forming the wing duct air-flow take-off part of the distribution means is divided either side of a diametrical line.

21. An aircraft as claimed in claim 20, in which the line extends in the forward and rearward directions.

22. An aircraft as claimed in claim 20, in which the line is defined by the separated line between deflection chutes running gradually downwardly, closing-off the space between the walls with the deflector chute walls running downwardly and leading to openings in the outer defining walls connected to the wing air-flow ducts and wing outlets.

23. An aircraft as claimed in claim 22, in which the walls are also inclined outwardly.

24. An aircraft as claimed in claim 1, in which for regions of the body or fuselage provided for aesthetic and aerodynamic purposes which create cavities therebeneath, such are sealed or filled with expanded foam material or the like so that such acts as flotation means to enable the aircraft to be able to float on water.

25. An aircraft as claimed in claim 1, in which suitable computer control means, are provided for balancing and controlling the air-flow deflector members and engine etc.

26. An aircraft as claimed in claim 25, in which the control means are such as to operate that at no time can the pilot move the controls to override a safety operational thrust sequence which maintains stability until it is in the flying mode except to hold for longer duration of vertical lift (time limited) or to hold for a longer gradient lift (time limited).

27. An aircraft as claimed in claim 1, in which at least one fan impeller is located in said rear duct and rotatable about a normally horizontal or substantially axis and driven by the said engine.

28. An aircraft as claimed in claim 27, in which two impellers are located in the rear duct and are driven in opposite directions.

29. An aircraft as claimed in claim 1, in which the engine is a lightweight turbo shaft turbine engine horizontally arranged with an output shaft connected to drive the impellers and at least partly located in the main air duct to be cooled by air passing therethrough.

30. An aircraft as claimed in claim 1, in which a jet engine is provided in or as the rear air duct to provide a rear thrust for forward propulsion.

31. An aircraft as claimed in claim 2, in which the engine is located beneath a normal level or substantially beneath a normal horizontal plane or level in which the wing outlets lie so as to enhance the stability of the aircraft.

32. An aircraft as claimed in claim 3, in which the engine is located beneath a normal level or substantially beneath a normal horizontal plane or level in which the wing outlets lie so as to enhance the stability of the aircraft.

* * * * *